US00RE36945E

United States Patent [19]

Kobayashi et al.

[11] E Patent Number: Re. 36,945

[45] Reissued Date of Patent: Nov. 7, 2000

[54] SHUTTER DEVICE IN AUTOMATIC FOCUSING AND EXPOSURE CAMERA

[75] Inventors: Takumi Kobayashi; Kiyoshi Kawano, both of Tokyo, Japan

[73] Assignee: Asahi Kogaku Kogyo Kabushiki Kaisha, Tokyo, Japan

[21] Appl. No.: 08/421,514

[22] Filed: Apr. 13, 1995

Related U.S. Patent Documents

Reissue of:

[64] Patent No.: 5,202,721
Issued: Apr. 13, 1993
Appl. No.: 07/574,780
Filed: Aug. 30, 1990

[30] Foreign Application Priority Data

| | | | |
|---|---|---|---|
| Sep. 1, 1989 | [JP] | Japan | 1-102932 |
| Sep. 1, 1989 | [JP] | Japan | 1-226524 |
| Sep. 19, 1989 | [JP] | Japan | 1-243104 |

[51] Int. Cl.[7] ..... G03B 7/08

[52] U.S. Cl. ..... 354/441; 354/430

[58] Field of Search ..... 354/435, 439, 354/441, 228, 231, 233, 414, 420, 422, 423

[56] References Cited

U.S. PATENT DOCUMENTS

| | | |
|---|---|---|
| 3,393,621 | 7/1968 | Kitanosono et al. . |
| 3,820,131 | 6/1974 | Tanaka . |
| 4,065,776 | 12/1977 | Iwata et al. . |
| 4,227,792 | 10/1980 | Rentschler . |
| 4,868,596 | 9/1989 | Ishida et al. . |

FOREIGN PATENT DOCUMENTS

| | | |
|---|---|---|
| 1172533 | 10/1960 | Germany . |
| 1260298 | 2/1968 | Germany . |
| 3829554 | 4/1989 | Germany . |
| 1416115 | 10/1939 | Japan . |
| 1073283 | 6/1967 | United Kingdom . |
| 1202675 | 8/1970 | United Kingdom . |
| 2027917 | 2/1980 | United Kingdom . |
| 2080558 | 2/1982 | United Kingdom . |
| 2158601 | 11/1985 | United Kingdom . |
| 8100464 | 2/1981 | WIPO . |

*Primary Examiner*—Russell E. Adams
*Attorney, Agent, or Firm*—Greenblum & Bernstein, P.L.C.

[57] ABSTRACT

A shutter device of a camera which includes first and second sector mechanisms which constitute a lens shutter and which are independently opened and closed to define an aperture. A photometer, for detecting the luminance of an object to be photographed, and a diaphragm controller for controlling the aperture defined by the second sector mechanism, in accordance with luminance data detected by the photometer, are provided. A shutter opening element is provided which normally closes the first sector mechanism and opens the first sector mechanism when the second sector mechanism is held to define a predetermined aperture determined by the diaphragm controller, and a shutter closing element is provided which closes the second sector mechanisms at a predetermined timing in accordance with the luminance data of the photometer after the first sector mechanism is opened by the shutter opening element.

48 Claims, 29 Drawing Sheets

SHUTTER DEVICE IN AUTOMATIC FOCUSING AND EXPOSURE CAMERA

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a shutter used in an automatic focus and automatic exposure camera, and more precisely it relates to a shutter in which shutter sectors are opened and closed to actuate (release) a lens shutter. The present invention also relates to a daylight synchro photographing method.

2. Description of the Related Art

In a known automatic focus and exposure camera the focusing control and the exposure control are successively effected in accordance with the release operation. The lens is first moved to a focused position in association with the release operation, and then, the lens shutter is actuated. In such an automatic focusing and automatic exposure camera, more than one sector (shutter blades) are opened and closed to selectively intercept the light path. The exposure value is determined in accordance with the opening operation of the sectors and the shutter speed is determined by a time in which the sectors are closed from the open position.

Thus, in the conventional shutter, since the same sectors are opened and closed for shutter control, it is very difficult to increase the shutter speed. Furthermore, in an attempt to increase the shutter speed, there is difficulty in synchronization of the strobe light emission with the shutter in the daylight synchro mode.

SUMMARY OF THE INVENTION

The primary object of the present invention is to provide a shutter device having an increased shutter speed.

Another object of the present invention is to provide a shutter device in which strobe light can be emitted synchronously with an increased shutter speed at the daylight synchro mode.

To achieve the objects mentioned above, according to the present invention, there is provided a shutter device for a camera comprising, first and second sector mechanisms which constitute a lens shutter and which are independently opened and closed to define an aperture. A photometer for detecting the luminance of an object to be photographed and diaphragm control device for controlling the aperture defined by the second sector mechanism in accordance with the luminance data detected by the photometer are provided. A shutter opening device for normally closing the first sector mechanism and opening the first sector mechanism when the second sector mechanism is held to define a predetermined aperture determined by the diaphragm control device, and a shutter closing device for closing the second sector mechanism at a predetermined timing in accordance with the luminance data of the photometer means after the first sector mechanism is opened by the shutter opening device are provided.

With this arrangement, the lens shutter can be simply constituted by the operations of the first sector mechanism and the second sector mechanism in combination. Furthermore, a desired shutter speed can be obtained only by the control of the shutter opening device and the shutter closing device, thus resulting in a realization of a high speed shutter. The exposure can be easily controlled by controlling the aperture of the second sector mechanism by the diaphragm control device.

Preferably, the diaphragm control device comprises ratchet teeth provided on the sector blades of the second sector mechanism, and an engaging member which is disengageably engaged by the ratchet teeth to hold or release the sector blades.

With this arrangement, the second sector mechanism can be locked to define a desired diaphragm aperture by the engagement of the ratchet teeth of the second sector mechanism and the engaging member.

According to another aspect of the present invention, there is provided a shutter device for a camera comprising a first sector mechanism which is normally biased to open by a first biasing device, a first sector mechanism abutment for holding the first sector mechanism at an optional aperture, a second sector mechanism which is normally biased to close by a second biasing device, a second sector mechanism abutment for holding the second sector mechanism at an optional aperture. A stepping motor which opens and closes the first and second sector mechanisms camera is provided. The a has a strobe and a photometer for detecting luminance data of an object to be photographed. The a has normal photographing mode in which the second sector mechanism is opened by the stepping motor at a predetermined diaphragm aperture in accordance with the luminance data. Thus, the second sector mechanism is held by the second sector mechanism abutment then, the first sector mechanism abutment means and the second sector mechanism abutment release the first sector mechanism and the second sector mechanism by the first biasing device and the second biasing device to open the first sector mechanism and close the second sector mechanism to complete the exposure. The camera also has a daylight synchro photographing mode in which the second sector mechanism is opened by the stepping motor to hold it by the second sector mechanism abutment. Then, the first sector mechanism is opened at a predetermined diaphragm aperture in accordance with the luminance data by the stepping motor. Finally the second sector mechanism abutment is released to close the second sector mechanism by the second biasing device to complete the exposure. The shutter device further comprising a daylight trigger for sending a light emission signal to the strobe at a predetermined light emission timing before the first sector mechanism provides a predetermined diaphragm aperture, in the daylight synchro photographing mode.

With this construction, the shutter can be simplified and an increased shutter speed can be provided. Since the operation of the first sector mechanism to commence the exposure in the daylight synchro mode can be controlled by the pulses, the motor strobe light can be emitted at a predetermined timing in accordance with a light emission signal synchronous with the pulses.

According to still another aspect of the present invention, there is provided a daylight synchro photographing method in a camera having a first and second sector mechanisms which constitute a lens shutter and which are independently open and closed. The camera also included a strobe, and a photometer for detecting the luminance of an object to be photographed. The method includes the a step of opening the second sector mechanism and holding it to a predetermined open position. The step of opening the first sector mechanism at a predetermined diaphragm aperture in accordance with the luminance data of the object, the step of sending a light emission signal to the strobe at a predetermined timing before the diaphragm aperture defined by the first sector mechanism becomes a predetermined value, and the step of closing the second sector mechanism.

According to this method, since the light emission trigger signal can be supplied to the strobe at a predetermined timing before a desired diaphragm aperture is defined by the first sector mechanism, the strobe light can be appropriately emitted.

BRIEF DESCRIPTION OF THE DRAWINGS

The invention will be described below in detail with reference to the accompanying drawings, in which.

DESCRIPTION OF THE PREFERRED EMBODIMENTS

Figure 1:
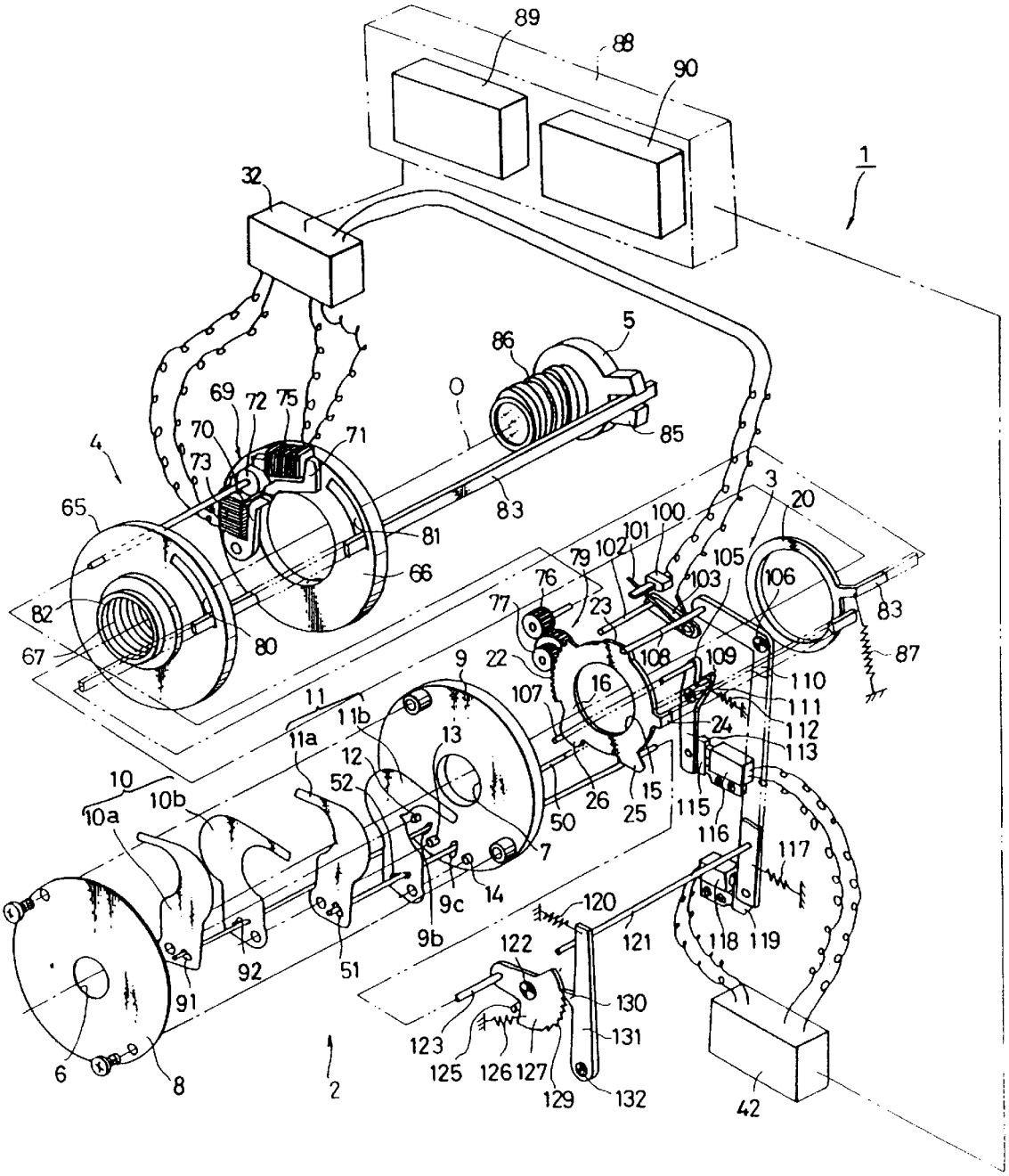
FIG. 1 is an exploded perspective view of a shutter device according to a first embodiment of the present invention.

FIG. 1 shows an exploded perspective view of a shutter device according to the first embodiment of the present invention.

The shutter device 1 of the present invention has a release portion 2, a drive portion 3, a drive mechanism holding block 4 and a focus adjusting lens barrel 5.

The release portion 2 has annular bases 8 and 9 having holes 6 and 7 having a center on the optical axis O. A first sector mechanism 10 having a pair of sector blades 10*a* and 10*b* and a second sector mechanism 11 having a pair of sector blades 11*a* and 11*b* are provided between the two annular bases 8 and 9.

The annular base 9 has shafts 12, 13 and 14. The sector blade 10*a* is rotatably mounted to the shaft 12, and the sector blade 11*b* is rotatably mounted to the shaft 14. The sector blades 10*b* and 11*a* are rotatably mounted to the shaft 13.

The drive portion 3 has an operational plate 16 which has a center hole 15. Around the operational plate 16 are provided a switch lever 103 which actuates a start switch 100, a lever member 110, an operational ring 20, a sector lever 113 and an engaging lever 131, etc.

The operational plate 16 has a hole 15 having a center on the optical axis O. The operational plate 16 is provided on its outer periphery with a gear 22, a cam portion 23, and operational lever 24 and cams 25 and 26 in this order.

Figure 2:
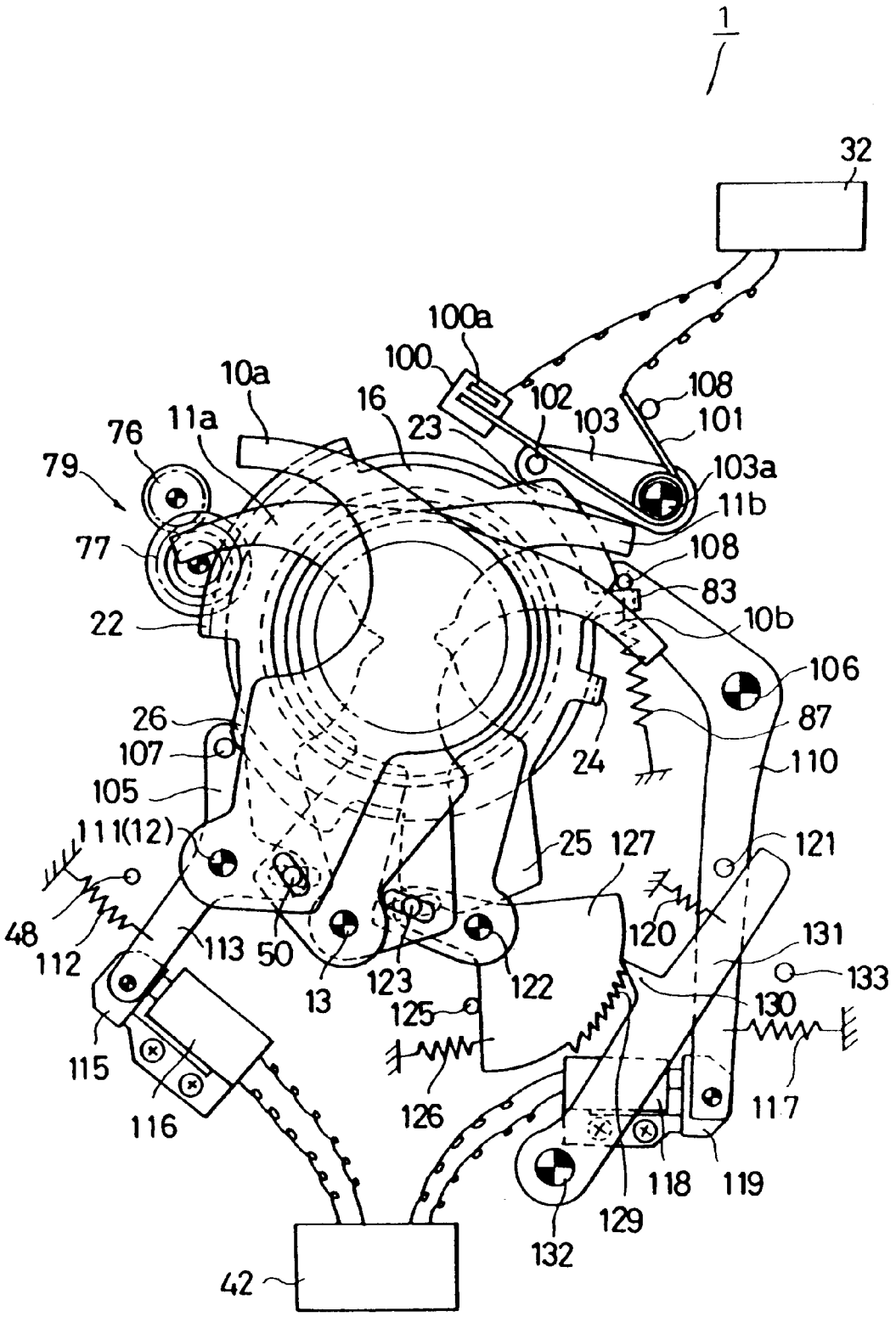
FIGS. 2 through 6 are front elevational views of a shutter device according to a first embodiment of the present invention, shown in different operational positions.

The start switch 100 has a switch lever 103 (FIG. 2). The switch lever 103 rotates about a shaft 103*a* about which a torsion spring 101 is provided. The torsion spring 101 bears at its one end against the an abutment bar 102 and at its opposite end against a pin 108 provided on the camera body, so that the switch lever 103 is continuously biased in the counterclockwise direction by the torsion spring to engage the abutment bar 103 against the cam portion 23. The switch lever 103 rotates in the clockwise and counterclockwise directions in accordance with the cam profile of the cam portion 23. When the switch lever 103 rotates in the clockwise direction, the one end of the spring 101 comes into contact with the terminal 100*a* of the start switch 100 to turn the switch ON. The opposite ends of the torsion spring 101 are connected to lead wires connected to a motor control circuit 32.

The lever member 110 is pivoted about the shaft 106 and has at its one end an operational bar member 108 which is guided by the cam member 23 to rotate in the clockwise and counterclockwise directions. The lever member 110 has at its opposite end a lateral bar member 121 and an armature 119. An electromagnet 118 for the second sector mechanism, which constitutes a shutter closing means is provided to correspond to the armature 119. The electromagnet 118 is connected to an electromagnet control circuit 42. A spring 117 is connected to the lever member 110 behind the armature 119 (on the right side in FIG. 2) to bias the latter in the counterclockwise direction.

The sector lever 113 has bifurcated portions (arms) 105 and 109 above the shaft 111. The operational bar 107 is mounted to one of the bifurcated arms, e.g. the arm 105, and a longer operational bar 50 is mounted to the other arm 109.

The operational bar 107 bears against the cam portion 26 of the operational plate 16. The longer operational bar 50 extends through an elongated hole 9*b* formed in the annular base 9 and elongated holes 91 and 92 formed in the sector blades 10*a* and 10*b*, respectively. In the initial position of the operational plate 16, the operational bar 107 is placed on the most raised (highest) portion of the cam portion 26, and accordingly, the sector lever 113 rotates in the counterclockwise direction against a first sector mechanism opening spring 112. The armature 115 attached to the selector lever 113 below the shaft 111 is moved to a position in which the armature is attracted by the electromagnet 116 for the first sector mechanism which constitutes the shutter opening means. At the same time, since the upward force is applied to the elongated holes 91 and 92 of the sector blades 10*a* and 10*b* by the operational bar 50, the sector blade 10*a* and the sector blade 10*b* are rotated in the counterclockwise direction and the clockwise direction to close the first sector mechanism, respectively.

An engaging lever 131 is provided on the side of the lever member 110. The engaging lever 131 is rotatably supported at one and by a shaft 132 and is biased by a spring 120 at the opposite end of the lever 131 in the counterclockwise direction. A sector association lever 127 is rotatably supported by a shaft 122 to be opposed to a ratchet pawl 130 of the engaging lever 131. The sector association lever 127 has serrated ratchet teeth 129 which are engaged by the ratchet pawl 130. The sector association lever 127 is biased by a second sector mechanism closing spring 126 in the clockwise direction. The angular displacement of the sector association lever 127 is restricted by a stop 125 provided on the camera body.

The sector association lever 127 has a sector association bar member 123 which laterally projects therefrom. The association bar member 123 extends through the elongated hole 9*c* of the annular base 9 and the elongated holes 51 and 52 of the sector blades 11*a* and 11*b*, respectively. When the association bar member 123 is pushed down by the cam portion 25 which moves in accordance with the rotation of the operational plate 16, the sector blades 11*a* and 11*b* are pushed down through the elongated holes 51 and 52. As a result, the sector blades 11*a* and 11*b* are rotated in the clockwise direction and the counterclockwise direction to open the second sector mechanism 11, respectively.

The drive mechanism holding block 4 has an intermediate frame 65 and a motor mount 66. The intermediate frame 65 is provided on its center portion with a female thread portion (threaded hole) 67. A stepping motor 69 is mounted to the motor mount 66.

The stepping motor 69 has stators 70 and 71 in a generally V-shape arrangement. A rotor 72 is located at the center (intermediate) portion of the stators 70 and 71. Coils 73 and 75 are wound around the stators 70 and 71 and are connected to the motor drive control circuit 32 through lead wires. The motor drive control circuit 32 constitutes a diaphragm control means together with the engaging lever 131 and the sector association lever 127.

The output shaft of the rotor 72 extends through the intermediate frame 65 and has at its front end a pinion 76 which is engaged by a pinion 77 which is in turn in mesh with the gear 22 of the operational plate 16. The pinions 76 and 77 constitute a reduction gear train 79.

The intermediate frame 65 and the motor mount 66 have arched grooves 80 and 81 extending along an imaginary circle having a center on the optical axis O, respectively. The intermediate frame 65 is provided on its center portion with a cylindrical portion (boss) 82 in which the operation ring 20 is fitted. An operational bar 83 provided on the operation ring 20 extends through the arched grooves 80 and 81 and is engaged in a bifurcated associated arm 85 which is provided on the focus adjusting lens barrel 5 at the front end of the operational bar 83.

The focus adjusting lens barrel 5 is provided on its outer periphery with a male thread portion 86 which is in mesh with the female thread portion 67 of the intermediate frame 65. Accordingly, when the stepping motor 69 is not driven, the focus adjusting lens barrel 5 is rotated by a largest angular displacement in the clockwise direction by the spring 87 to retract the lens to an innermost position. On the other hand, when the stepping motor 69 is driven to rotate the operational plate 16 of example in the counterclockwise direction, a bent portion 24 of the operational plate 16 presses the operational lever 83 of the operation ring 20 after the lapse of a predetermined time. As a result, the operational lever 83 rotates along the profile of the arched grooves 80 and 81, so that the focus adjusting lens barrel 5 is rotated in the same direction to be advanced.

The motor drive control circuit 32 and the electromagnet control circuit 42 are connected to an arithmetic operation circuit 88 which has therein a luminance detecting means 89 for detecting luminance data of an object to be taken in accordance with the measurement of a photometer switch (not shown), and an object distance detecting means 90 for detecting an object distance data in accordance with an object distance switch (not shown). In FIG. 2, numeral 48 designates a pin which restricts the rotational movement of the sector lever 113 in the counterclockwise direction, and 113 a pin which restricts the rotational movement of the lever member 110 in the clockwise direction.

The shutter device 1 according to the present invention operates as follows (FIGS. 2 through 7).

In an initial position shown in FIG. 2 in which both the photometer switch and the object distance switch are turned OFF, the electromagnet 116 for the first sector mechanism and the electromagnet 118 for the second sector mechanism are both deenergized, and the stepping motor 69 is not driven. Namely, the operational plate 16 is maintained at the initial angular position, and accordingly, the operational bar 107 rides on the most raised portion of the cam portion 26 to rotate the sector lever 113 in the counterclockwise direction. As a result, the operation bar 50 is rotated in the same direction to rotate the sector blades 10*a* and 10*b* in the counterclockwise direction and the clockwise direction respectively, to close the shutter thereby, to intercept the optical path.

In this state, since the bar member 123 is in contact with the lowermost portion of the cam member 25, the sector association lever 127 is rotated by the largest angular displacement in the clockwise direction by the second sector mechanism closing spring 126 to a position in which the angular displacement thereof is restricted by the stop 125. The operational bar member 108 of the lever member 110 comes into contact with the end of the cam portion 23 so that the lever member 110 is rotated against the spring 117 in the clockwise direction. Since the bar member 121 releases the engaging lever 131, the lever 131 is rotated by the spring 120 in the counterclockwise direction, so that the ratchet pawl 130 bears against the sector association lever 127. Consequently, the bar member 123 is moved in the elongated hole 9*c* of the annular base 9 toward the center of the annular base 9 to rotate the sector blades 11*a* and 11*b* to intercept the optical path. Thus, the shutter is closed.

In this state, since there is a predetermined distance between the bent portion 24 of the operational plate 16 and the operational lever 83 of the operation ring 20, the operation ring 20 is fully rotated in the clockwise direction by the spring 87. As a result, the operational lever 83 is rotated in the same direction to come into contact with the ends of the arched grooves 80 and 81 of the intermediate frame 65 and the lens frame 66 in the clockwise direction in order to rotate the focus adjusting lens barrel 5 by the largest angular displacement in the same direction. Thus, the lens is retracted into the innermost position.

The switch lever 103 is rotated in the counterclockwise direction when the abutment bar 102 rides on the lower portion of the cam portion 23, so that one end (contact point) of the spring 101 is separated from the terminal 100*a* to keep the start switch 100 OFF.

When the photometer switch and he object distance switch are turned ON (i.e., when the release switch is pushed down by a half step), the arithmetic operation circuit 88 operates, so that the luminance data and the object distance data are arithmetically calculated by the luminance detecting means 89 and the object distance detecting means 90, respectively.

When the release switch is made ON, a predetermined number of forward rotation pulses corresponding to the object luminance is sent to the stepping motor 69 from the motor drive control circuit 32 in accordance with the luminance data of the photometer means 89 to rotate the stepping motor 69 in the forward direction (clockwise direction). At the same time, the second electromagnet 118 (for the second sector mechanism) is energized in response to the signal from the electromagnet control circuit 42 in accordance with the arithmetic operation circuit 88 to attract the armature 119. Similarly, the electromagnet 116 is energized to attract the armature 115.

As a result, the lever member 110 is attracted at the opposite end thereof, so that it can not be rotated in the counterclockwise direction, even if the operational bar member 108 is disengaged from the cam portion 23. Similarly, the opposite end of the sector lever 113 is attracted, so that it can not be rotated in the clockwise direction even if the operational bar 107 is disengaged from the cam portion 26. Simultaneously, the stepping motor 69 receives a predetermined number of forward rotation pulses corresponding to the diaphragm value detected, based on the photometer data, so that the coils 73 and 75 are activated to rotate the rotor 72 in the clockwise direction.

When the rotor 72 causes the operational plate 16 to rotate in the clockwise direction through the reduction gear train 79, the cam portion 25 gradually pushes the sector association bar member 123 downward. As a result, the sector association bar member 123 is moved radially and outwardly in the elongated hole 9*c* of the annular base 9 to rotate the sector blade 11*a* and the sector blade 11*b* in the clockwise direction and the counterclockwise direction, respectively.

One step of the stepping motor 69 corresponds to one tooth of the ratchet teeth 129 of the sector association lever 127, which in turn corresponds to one diaphragm value. Therefore, the rotation of the stepping motor 69 by a predetermined number of steps causes the second sector mechanism 11 to open to obtain a desired exposure value.

Figure 3:
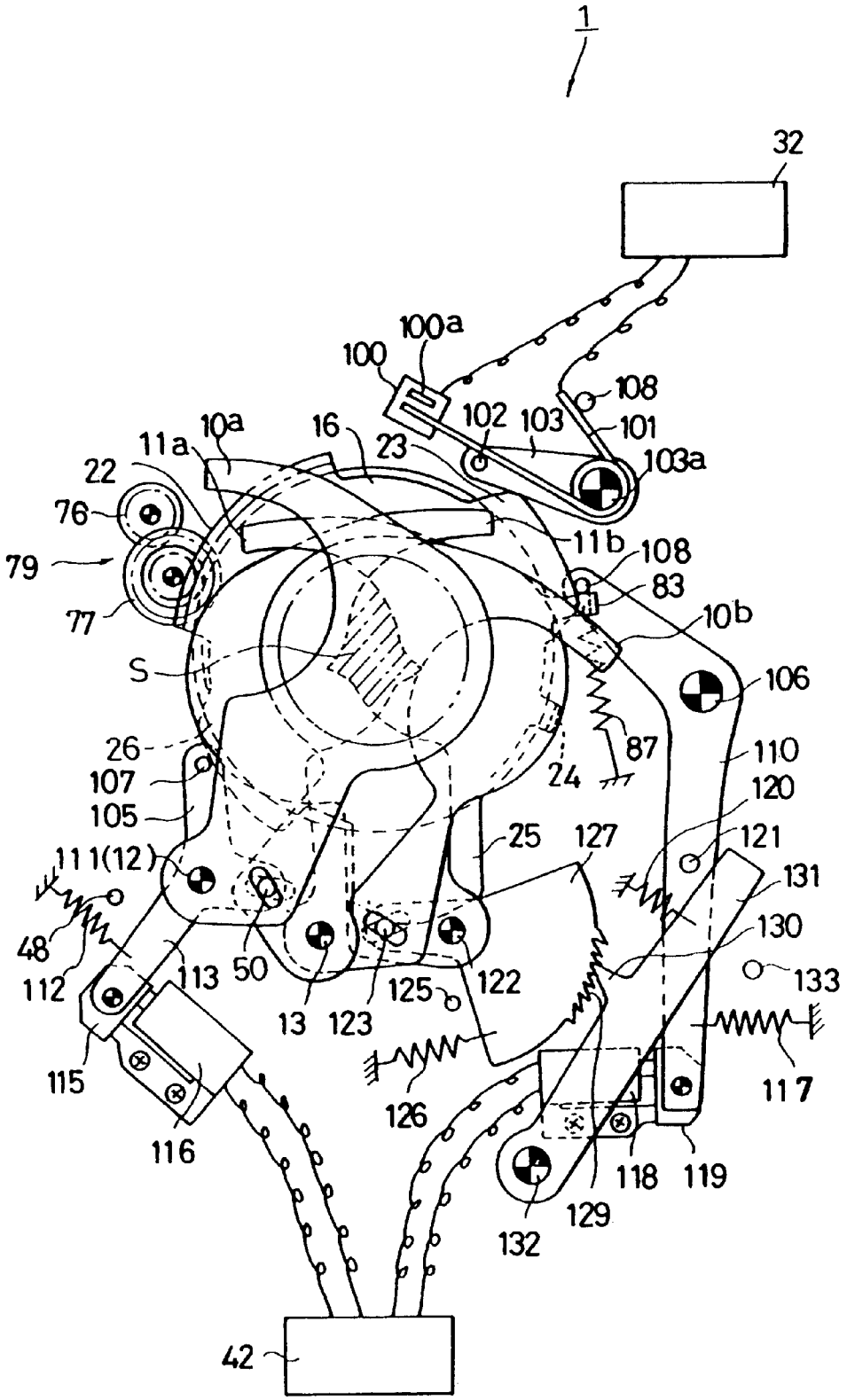

When the rotor 72 is stopped after it rotates by a predetermined number of steps, the second sector mechanism 11 defines an opening (aperture) S corresponding to a desired exposure value, as shown in FIG. 3. The ratchet pawl 130 rides on the ratchet teeth 129 tooth by tooth. When the operational plate 16 stops, the sector association lever 123 is locked at the position of the engagement of the ratchet pawl 130 with one of the ratchet teeth 129 to hold the second sector mechanism 11 at the open position. In this state, since the first sector mechanism 10 is maintained in a closed position, the shutter opening 59*a* is closed, so that no exposure takes place.

Figure 4:
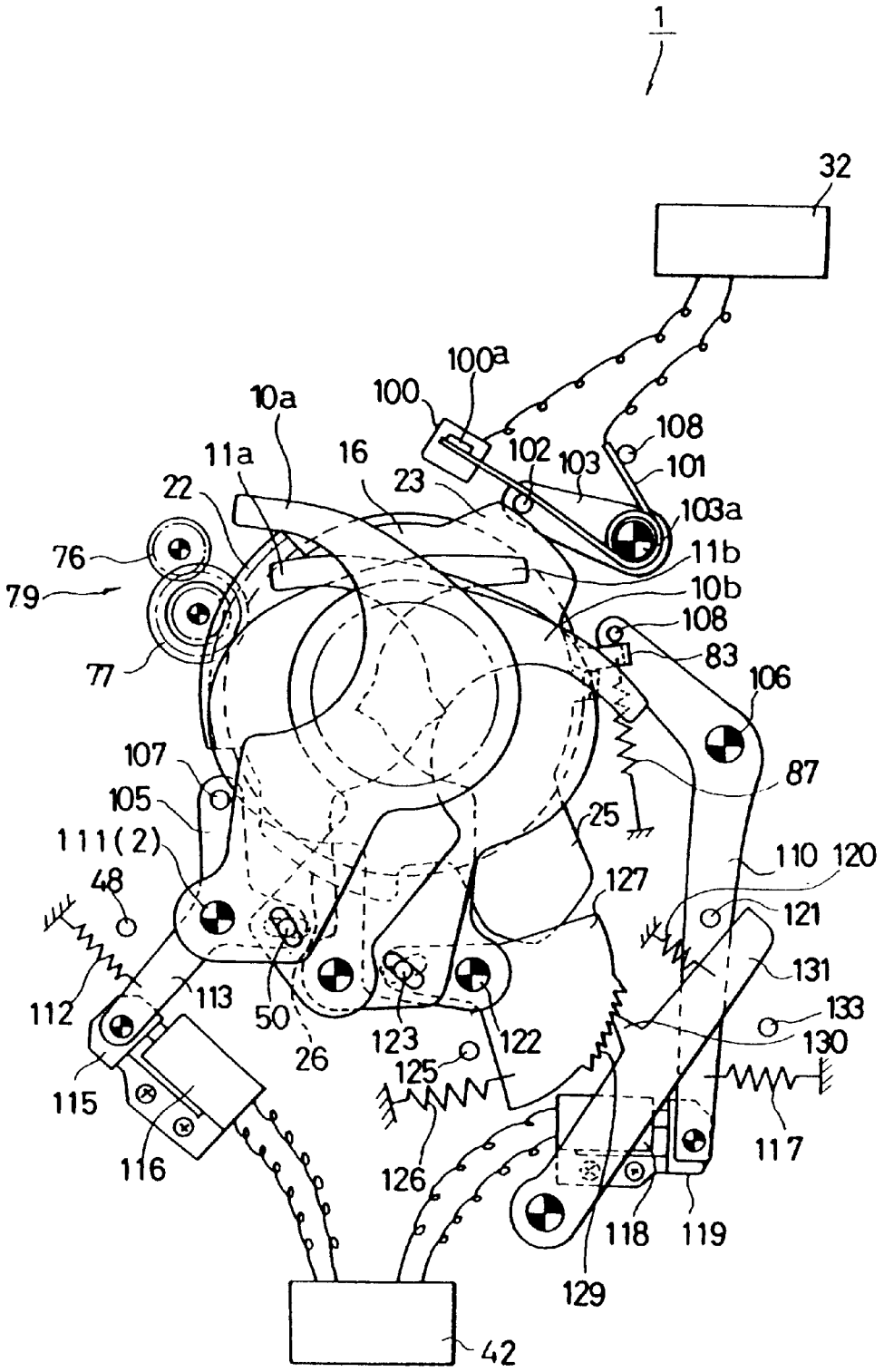

Thereafter, a predetermined number of steps of reverse rotation pulses are generated from the motor drive control circuit 32 to the stepping motor 69 to reverse the rotor 72 in the counterclockwise direction, thereby to rotate the operational plate 16 in the counterclockwise direction through the reduction gear train 79. As a result, the operational bar 107 is gradually disengaged from the cam portion 26. Nevertheless, no rotation of the sector lever 113 in the clockwise direction occurs, since the armature 115 is attracted by the first electromagnet 116. Thus, the first sector mechanism 10 is kept in the closed position. The cam portion 23 causes the abutment bar 102 to move up to rotate the switch lever 103 in the clockwise direction against the torsion spring 101. Consequently, the one end of the torsion spring 101 comes into contact with the terminal 100*a* of the start switch 100 to make the start switch ON (FIG. 4). During these operations caused by the rotation of the operational plate 16, the bent portion 24 of the operational plate 16 does not actuate the focus adjusting lens barrel 5, since there is a predetermined distance between the bent portion 24 and the operational lever 83, as mentioned before.

A further rotation of the stepping motor 69 in the counterclockwise direction continues until the number of steps reaches a predetermined value corresponding to the focal position detected by the object distance detecting means 90. As a result, when the bent portion 24 of the operational plate 16 comes into contact with the operational lever 83 from a predetermined angular position, the operation ring 20 begins rotating in the counterclockwise direction. Consequently, the operational lever 83 moves in the elongated holes 80 and 81 of the intermediate frame 65 and the motor mount 66 to rotate the focus adjusting lens barrel 5 in the same direction, so that the focus adjusting lens barrel 5 is advanced to the focal position. When the focus adjusting lens barrel 5 is moved to the focal position, the stepping motor 69 stops rotating in response to the stop signal from the motor drive control circuit 32.

Figure 5:
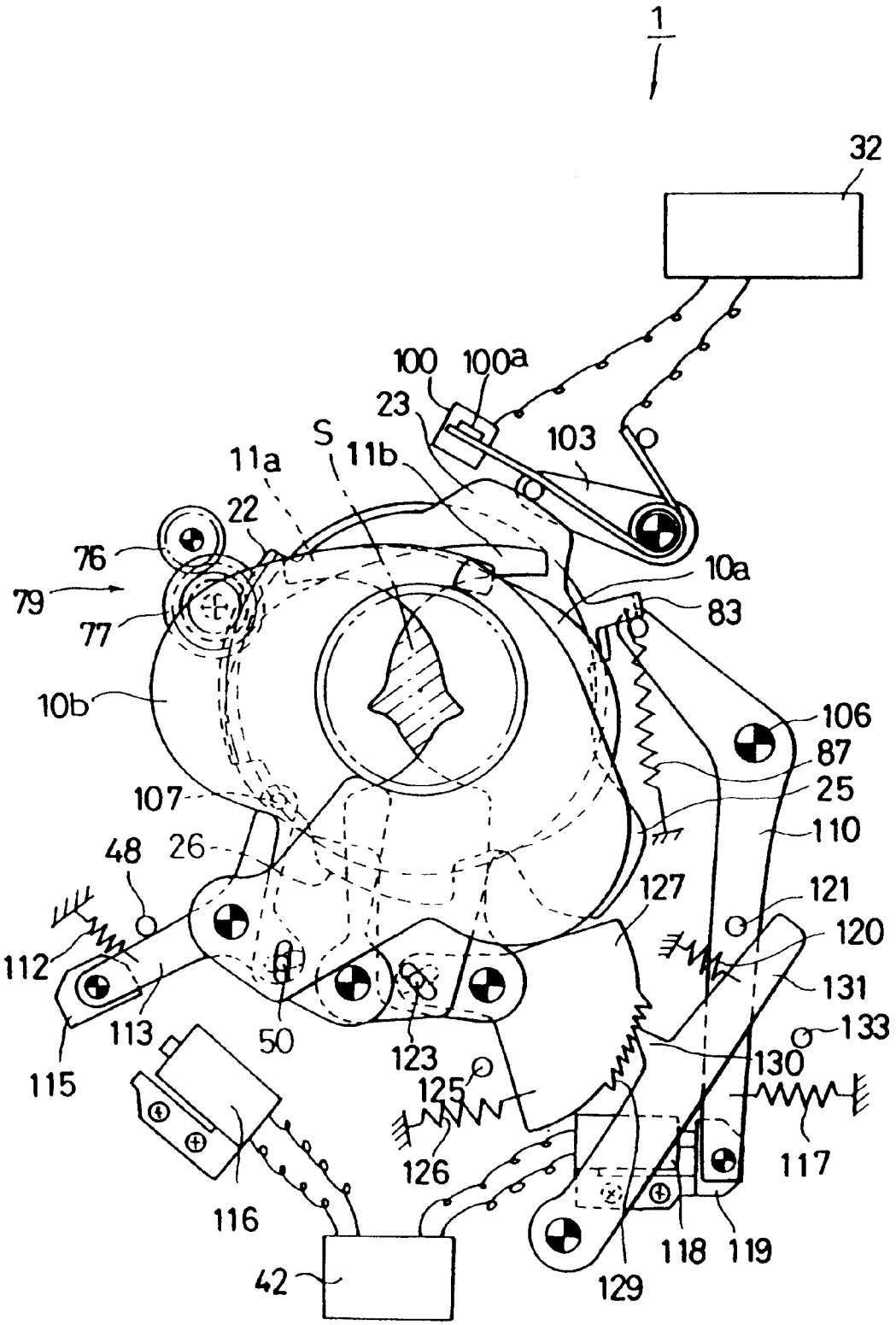

As a result, a signal is issued from the electromagnet control circuit 42 to deenergize the electromagnet 116, thereby to release the armature 115 and accordingly the sector lever 113. Consequently, the sector lever 113 is rotated in the clockwise direction by the first sector mechanism opening spring 112 (FIG. 5). The operational bar 50 is moved in the radial and outward direction of the annular base 9 to rotate the sector blades 10*a* and 10*b* in the clockwise direction and the counterclockwise direction respectively, so that the first sector mechanism 10 is fully opened. Since the second sector mechanism 11 is opened at a predetermined aperture (exposure value), as mentioned above, an exposure can be made through the first and second sector mechanisms 10 and 11.

Figure 6:
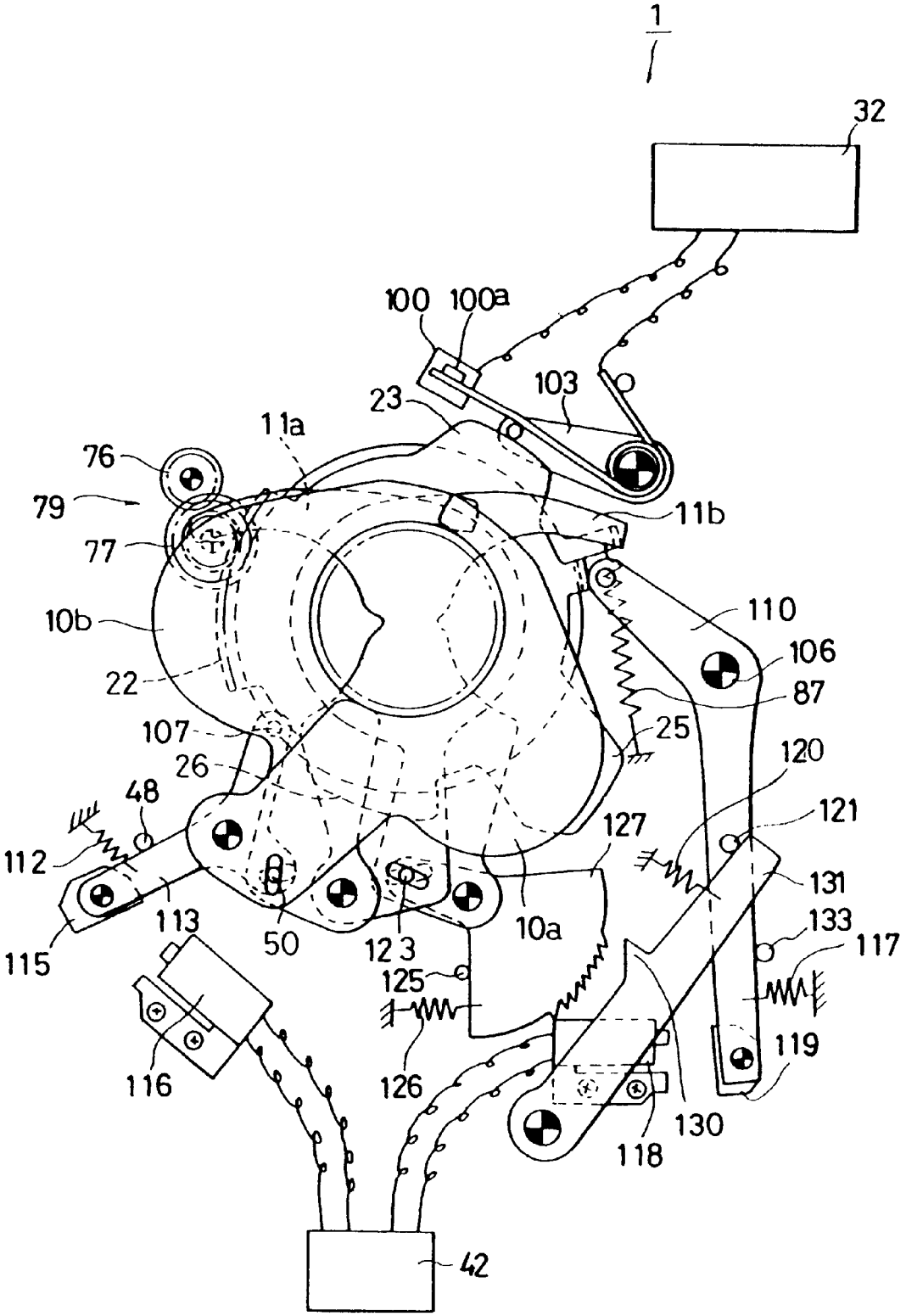
Figure 7:
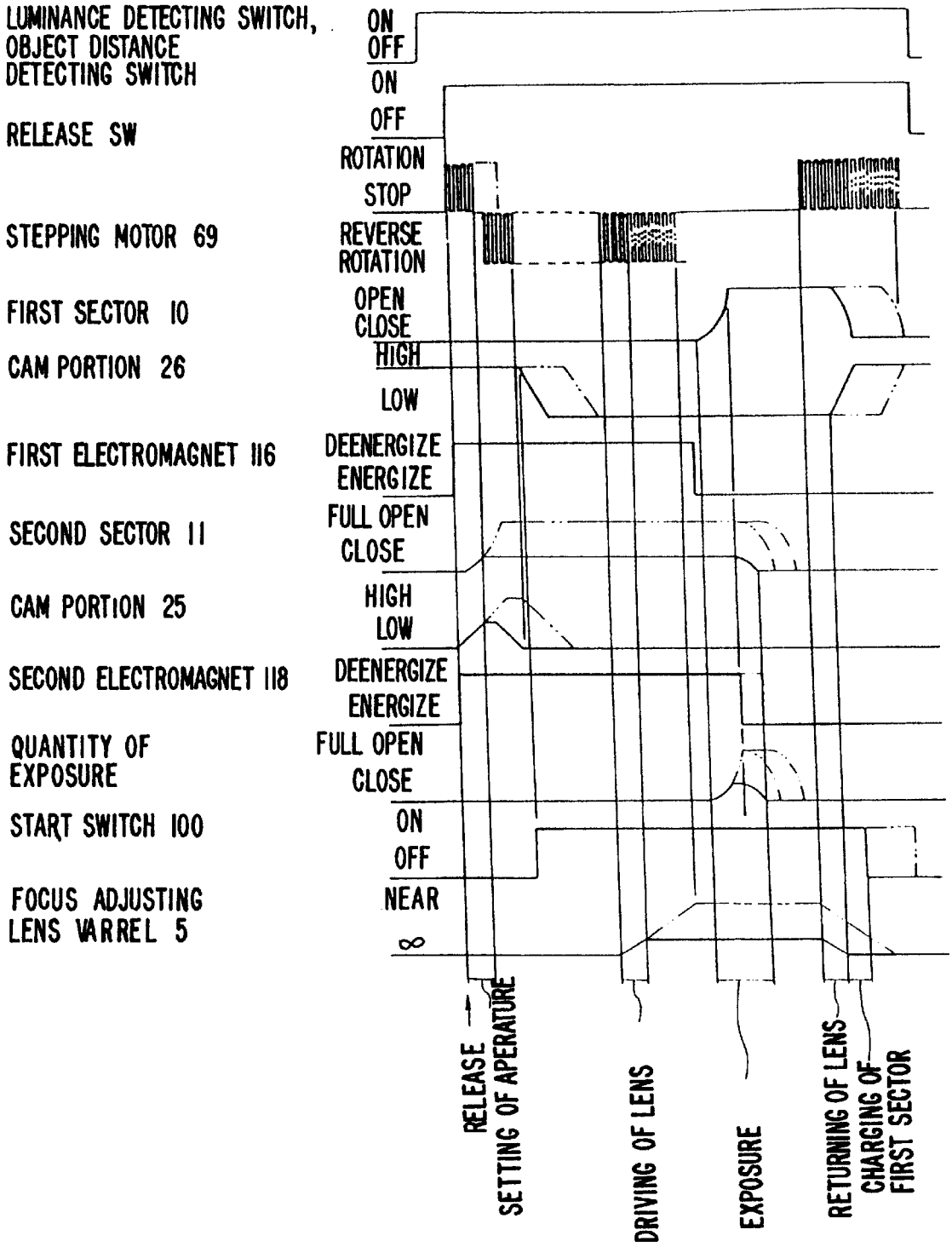
FIG. 7 is a timing chart of various elements of a shutter device according to a first embodiment of the present invention.

After the lapse of a predetermined time of exposure determined by the photometer means 89, the second electromagnet 118 is deenergized in response to the signal of the electromagnet control circuit 42, so that the armature 119 and accordingly the lever member 110 are released and rotated in the counterclockwise direction by the spring 117. Since the spring 117 is stronger than the spring 120, the engaging lever 131 is rotated in the clockwise direction through the bar member 121. Consequently, the ratchet pawl 130 is disengaged from the ratchet teeth 129 to release the sector association lever 127 (FIG. 6).

As a result, the sector association lever 127 is rotated in the clockwise direction by the second sector mechanism closing spring 126 until the sector association lever 127 comes into contact with the stop 125. Since the cam portion 25 is retracted from the sector association lever 123 by the rotation of the operational plate 16, the sector association lever 123 is moved in the radial and inward direction along the elongated hole 9*c* of the annular base 9. As a result, the sector blade 11*a* and the sector blade 11*b* are rotated in the counterclockwise direction and the clockwise direction respectively, to close the second sector mechanism 11, so that the exposure through the opening of the first sector mechanism 10 is finished. After the exposure, the stepping motor 69 rotates in the clockwise direction by a predetermined number of steps of forward rotation pulses from the motor drive control circuit 32 to rotate the operational plate 16 in the clockwise direction, so that the shutter device 1 is returned to the initial position shown in FIG. 2.

In the illustrated embodiment, the stepping motor 69 causes the second sector mechanism 11 to open at a desired aperture, and the electromagnets 116 and 118 are deenergized at a predetermined timing to obtain a desired exposure value and a desired shutter speed, as mentioned above. It is possible to manually set the aperture of the second sector mechanism 11 and the opening and closing timings of the first and second sector mechanisms 10 and 11.

Figure 8:
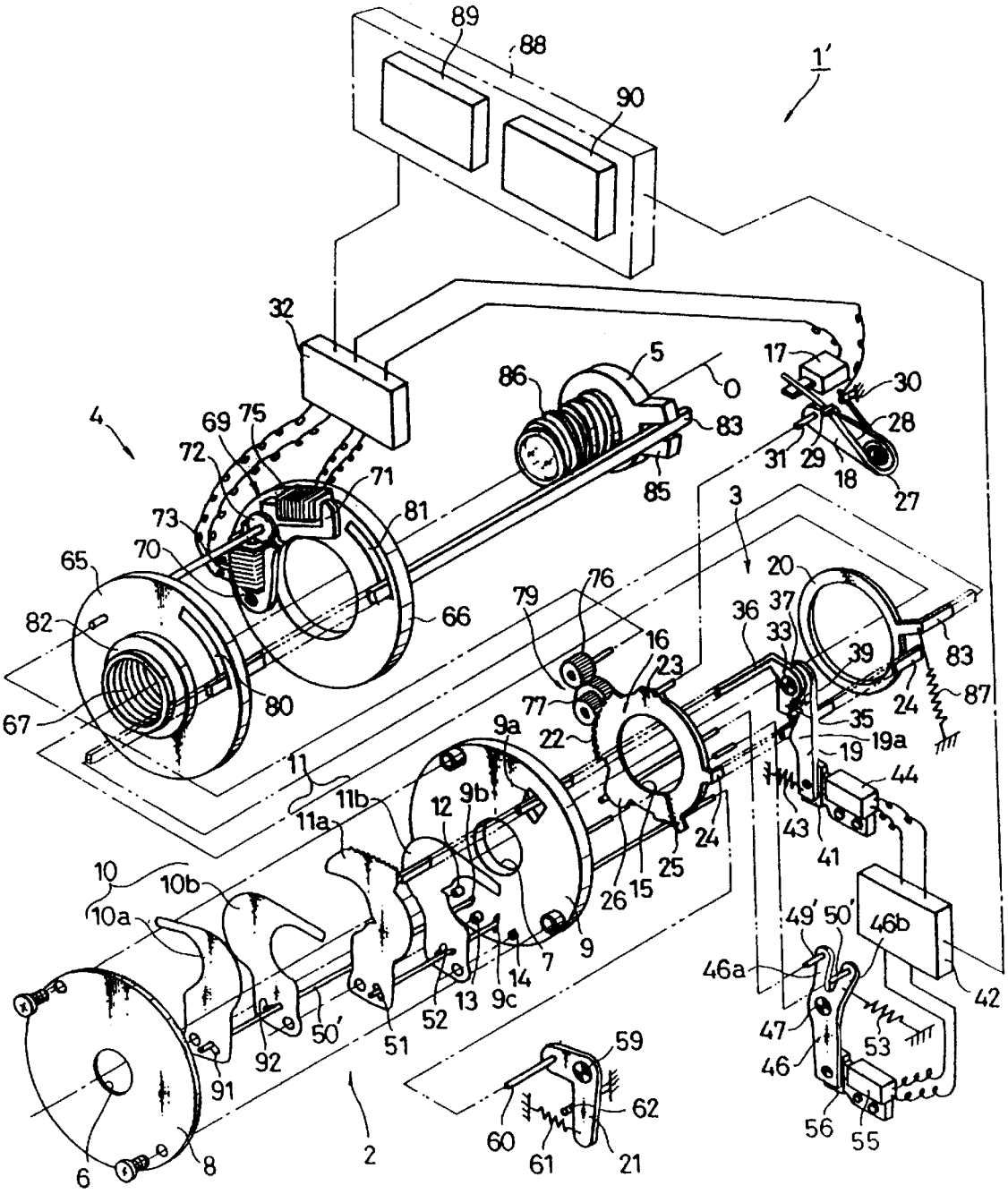
FIG. 8 is an exploded perspective view of a shutter device according to a second embodiment of the present invention.

The following discussion will be directed to a second embodiment of the present invention, shown in FIG. 8 in which the elements corresponding to those in the above mentioned first embodiment are designated with the same reference numerals.

The start switch 17, the lever member 19, the operation ring 20 and the second sector mechanism lever 21, etc., are provided around the operational plate 16 of the shutter device 1'.

The start switch 17 has the switch lever 18 which is rotatable about the shaft 27 about which the torsion spring 28 is wound. The torsion spring 28 bears at its one end against the hook 29 and at its opposite end against the pin 30 secured to the camera body to continuously bias the switch lever 18 in the counterclockwise direction. The switch lever 18 has a laterally projecting abutment bar 31 which is guided by the cam portion 23 to rotate in the clockwise and counterclockwise directions. The rotation of the switch lever in the counterclockwise direction causes one end of the spring 28 to come into contact with the terminal 17*a* of the start switch 17 to turn the start switch 17 ON. The opposite ends of the torsion spring 28 are connected to the lead wires connected to the motor drive control circuit 32.

The lever member 19 is pivoted at its one end by a shaft 33 and has at its center portion a projection 19*a* projecting in the left hand direction in FIG. 8. The lever 19 has the abutment pin 35 in the vicinity of the shaft 33. The operational member 37 which is formed by bending one end of the abutment lever 36 is rotatably connected to one end of the lever member 19. The end of the operational member 37 comes away from and close to the abutment pin 35 provided on the lever member 19. The spring 39 is provided between the end of the operational member 37 and the lever member 19, so that the operational member 37 is biased in the counterclockwise direction by the spring 39 to elastically bear against the abutment pin 35. The rotational displacement of the operational member 37 in the counterclockwise direction is restricted by the positioning pin 40 provided on the shutter device body.

An armature 41 is mounted to the opposite end of the lever member 19. The second electromagnet 44 for the second sector mechanism, connected to the electromagnet control circuit 42 is provided to be opposed to the armature 41. The spring 43 is provided behind (on the left side of) the armature 41, so that when the second electromagnet 44 is not energized, the lever member 19 is rotated in the clockwise direction together with the operational member 37 until the lever member 19 comes into contact with the stop pin 45.

The abutment lever 36 of the operational member 37 is laterally bent to extend through the hole 9*a* of the annular base 9, above the sector blade 11*a*. The sector blade 11*a* is provided on its upper portion with arched and serrated ratchet teeth 54. Consequently, when the sector blade 11*a* is rotated in the clockwise direction, the abutment leer 36 which is elastically engaged with the ratchet teeth 54 by the spring 39 rides on the ratchet teeth 54 tooth by tooth. When the sector blade 11*a* stops rotating, the abutment lever 36 locks the sector blade 11*a* by the engagement of the abutment lever 36 with one of the ratchet teeth 54.

The first sector mechanism lever 46 is rotatably supported by the shaft 47 and has the bifurcated arms 46*a* and 46*b* above the shaft 47. The operational bar 49' is connected to the arm 46*a* and the longer operational bar 50' is connected to the other arm 46*a*. The operational bar 49' bears against the cam portion 26 of the operational plate 16. The operational bar 50' extends through the elongated hole 9*b* of the annular base 9 and the elongated holes 91 and 92 of the sector blades 10*a* and 10*b*. In the initial position of the operational plate 16, the operational bar 49' is placed on the most raised portion of the cam 26, and accordingly, the first sector mechanism lever 46 is rotated in the counterclockwise direction against the spring 53 to move the armature 56 provided below the shaft 47 to a position in which the armature 56 can be magnetically attracted by the first electromagnet 55. At the same time, the first sector mechanism 10 is closed, since the upward force of the operational bar 50' is applied to the elongated holes 91 and 92 of the sector blades 10*a* and 10*b*, so that the sector blades 10*a* and 10*b* are rotated in the counterclockwise direction and the clockwise direction, respectively.

The shutter device 1' according to the present invention operates as follows (FIGS. 9 through 14).

Figure 9:
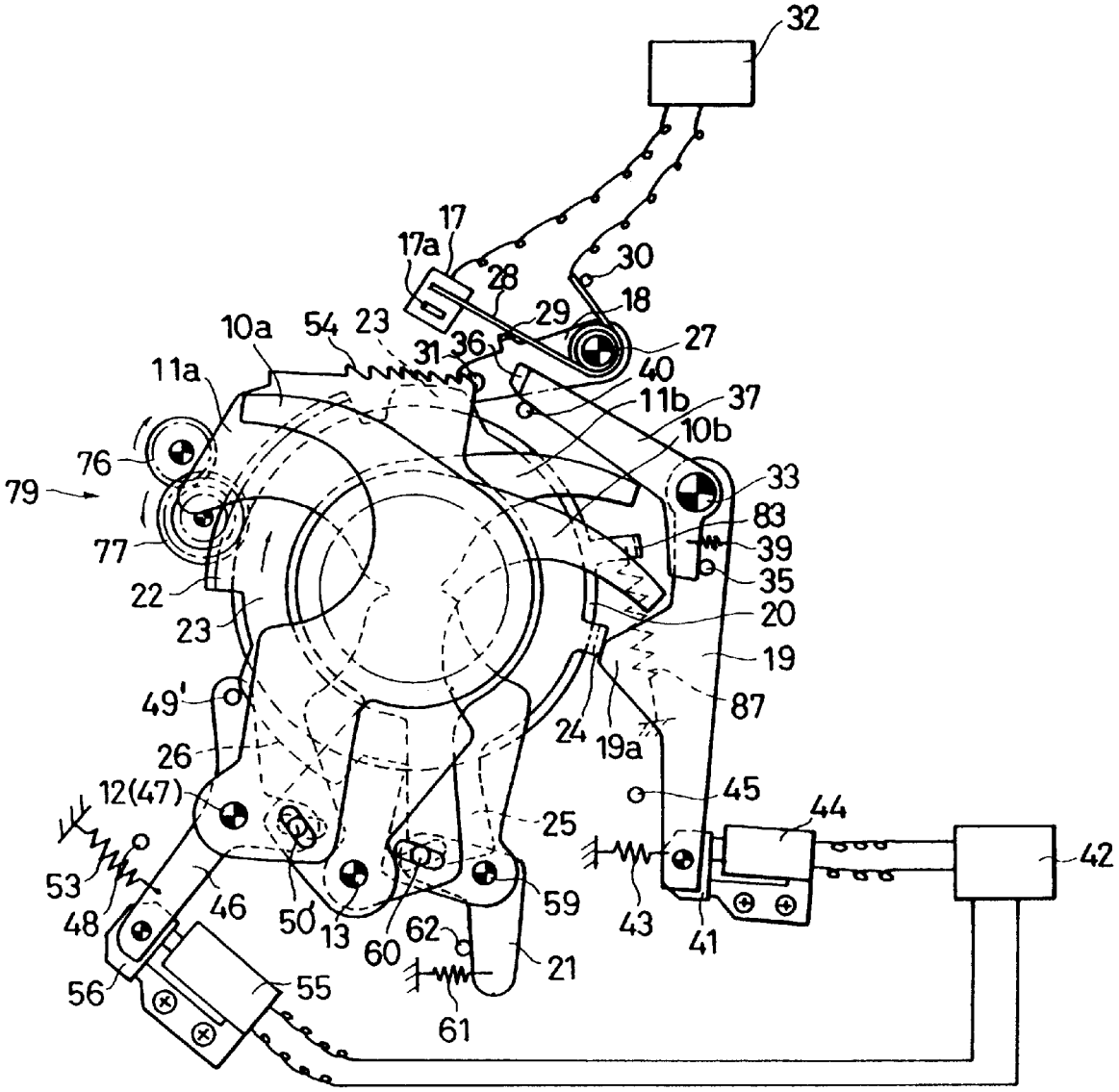
FIGS. 9 through 13 are front elevational views of a shutter device according to a second embodiment of the present invention, shown in different operational positions.

In an initial position shown in FIG. 9 in which both the photometer switch and the object distance switch are turned OFF, the electromagnet 55 for the first sector mechanism and the electromagnet 44 for the second sector mechanism are both deenergized, and the stepping motor 69 is not driven. Thus, the operational plate 16 is maintained at the initial angular position, and accordingly, the operational bar 49' rides on the most raised portion of the cam portion 26 to rotate the sector lever 46 in the counterclockwise direction. As a result, the operation bar 50' is rotated in the same direction to rotate the sector blades 10*a* and 10*b* in the counterclockwise direction and the clockwise direction respectively, to close the shutter thereby, to intercept the optical path.

In this state, since the sector association bar 60 is in contact with the lowermost portion of the cam member 25 the second sector mechanism lever 21, is rotated by the largest angular displacement in the clockwise direction by the spring 61 to a position in which the angular displacement thereof is restricted by the stop 62.

The operational lever 24 of the operational plate 16 comes into contact with the projection 19*a* of the lever member 19, so that the lever member 19 is rotated against the spring 43, in the clockwise direction. Consequently, the armature 41 comes into contact with the second electromagnet 44, and the abutment lever 36 is restricted by the positioning pin 40 and can engage with the ratchet teeth 54 of the sector blade 11*a*.

In this state, since there is a predetermined distance between the operational lever 24 of the operational plate 16 and the operational lever 83 of the operation ring 20, the operation ring 20 is fully rotated in the clockwise direction by the spring 87. As a result, the operational lever 83 is rotated in the same direction to come into contact with the ends of the arched grooves 80 and 81 of the intermediate frame 65 and the motor amount 66 in the clockwise direction in order to rotate the focus adjusting lens barrel 5 by the largest angular displacement in the same direction. Thus, the lens is retracted into the innermost position. The switch lever 19 is rotated in the clockwise direction when the abutment bar 31 rides on the most raised portion of the cam 23, so that one end (contact point) of the spring 28 separates from the terminal 17*a* to keep the start switch 17 OFF.

When the photometer switch and the object distance switch are turned ON, the arithmetic calculation circuit 88 operates, so that the luminance data and the object distance data are arithmetically calculated by the luminance detecting means 89 and the object distance detecting means 90, respectively.

When the release switch is turned ON, a predetermined number of forward rotation pulses corresponding to the object luminance is sent to the stepping motor 69 from the motor drive control circuit 32 in accordance with the luminance data of the photometer means 89 to rotate the stepping motor 69 in the forward direction (clockwise direction). At the same time, the second electromagnet 44 (for the second sector mechanism) is energized in response to the signal from the electromagnet control circuit 42 in accordance with the arithmetic operation circuit 88 to attract the armature 41. Similarly, the electromagnet 55 is energized to attract the armature 56. As a result, the lever member 19 is attracted at the opposite end thereof, so that it can not be rotated in the clockwise direction, even if the projection 19*a* is released from the operational lever 24. Similarly, the opposite end of the first sector mechanism lever 46 is attracted, so that it can not be rotated in the clockwise direction even if the operational bar 49' is disengaged from the cam portion 26. Simultaneously, the stepping motor 69 receives a predetermined number of steps of forward rotation pulses corresponding to the diaphragm value detected, based on the photometer data, so that the coils 73 and 75 are activated to rotate the rotor 72 in the clockwise direction.

When the rotor 72 causes the operational plate 16 to rotate in the clockwise direction through the reduction gear train 79, the cam portion 25 gradually pushes the sector association bar member 60 downward. As a result, the sector association bar member 60 is moved radially and outwardly in the elongated hole 9*c* of the annular base 9 to rotate the sector blade 11*a* and the sector blade 11*b* in the clockwise direction and the counterclockwise direction, respectively.

One step of the stepping motor 69 corresponds to one tooth of the ratchet teeth 54 of the sector blade 11*a,* which in turn corresponds to one diaphragm value. Therefore, the rotation of the stepping motor 69 by a predetermined number of steps causes the second sector mechanism 11 to open to obtain a desired exposure value.

Figure 10:
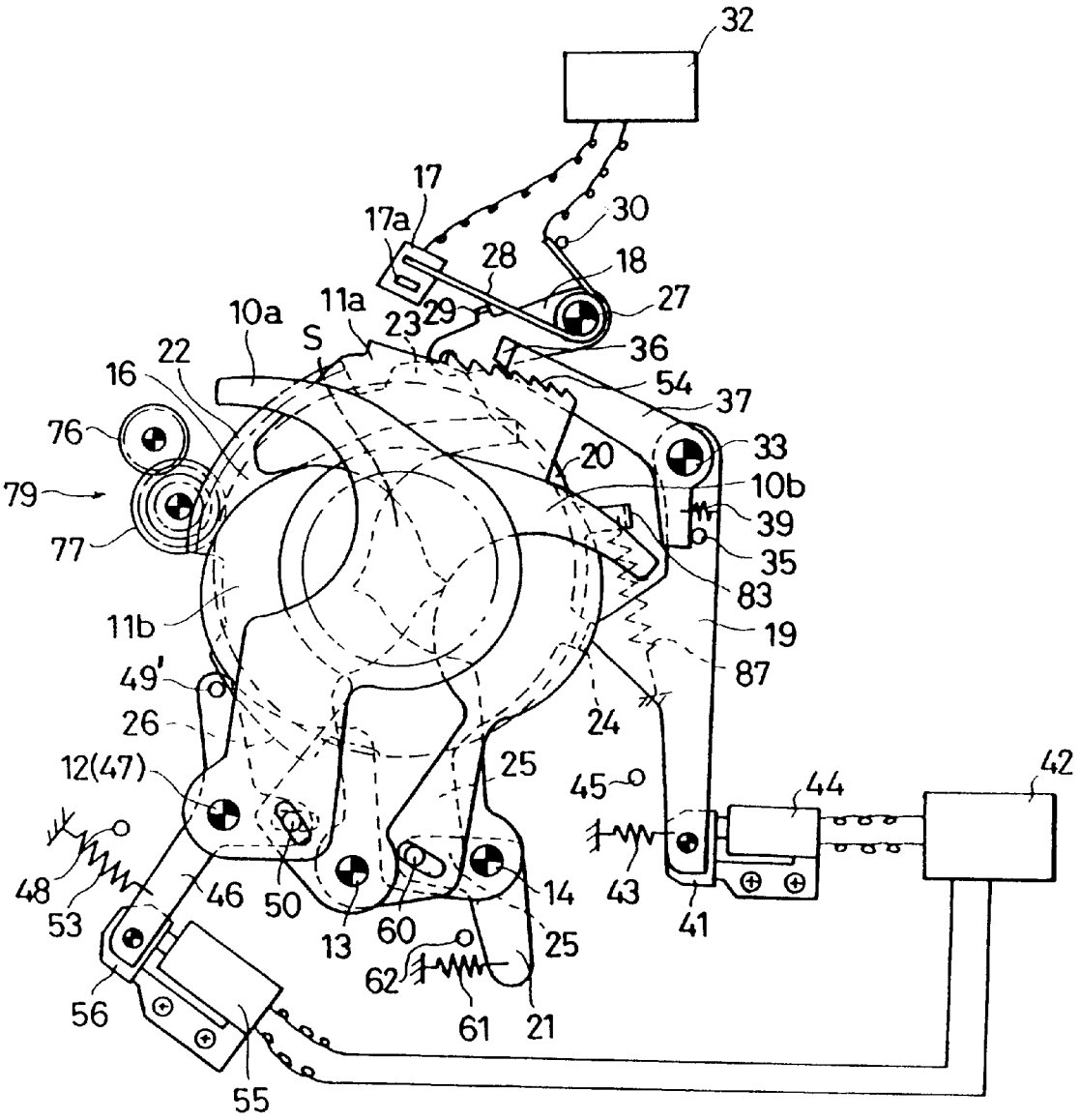

When the rotor 72 is stopped after it rotates by a predetermined number of steps, the second sector mechanism 11 defines an opening (aperture) S corresponding to a desired exposure value, as shown in FIG. 10. The abutment lever 36 rides on the ratchet teeth 54 tooth by tooth. When the operational plate 16 stops, the abutment lever 36 is locked to hold the second sector mechanism 11 at the open position. In this state, since the first sector mechanism 10 is maintained in a closed position, the shutter opening 6 is closed, so that no exposure takes place.

Thereafter, a predetermined number of steps of reverse rotation pulses are generated from the motor drive control circuit 32 to the stepping motor 69 to reverse the rotor 72 in the counterclockwise direction, thereby to rotate the operational plate 16 in the counterclockwise direction through the reduction gear train 79. As a result, the operational bar 49' is gradually disengaged from the cam portion 26. Nevertheless, no rotation of the first sector mechanism lever 46 in the clockwise direction occurs, since the armature 56 is attracted by the first electromagnet 55. Thus, the first sector mechanism 10 is kept in the closed position.

Figure 11:
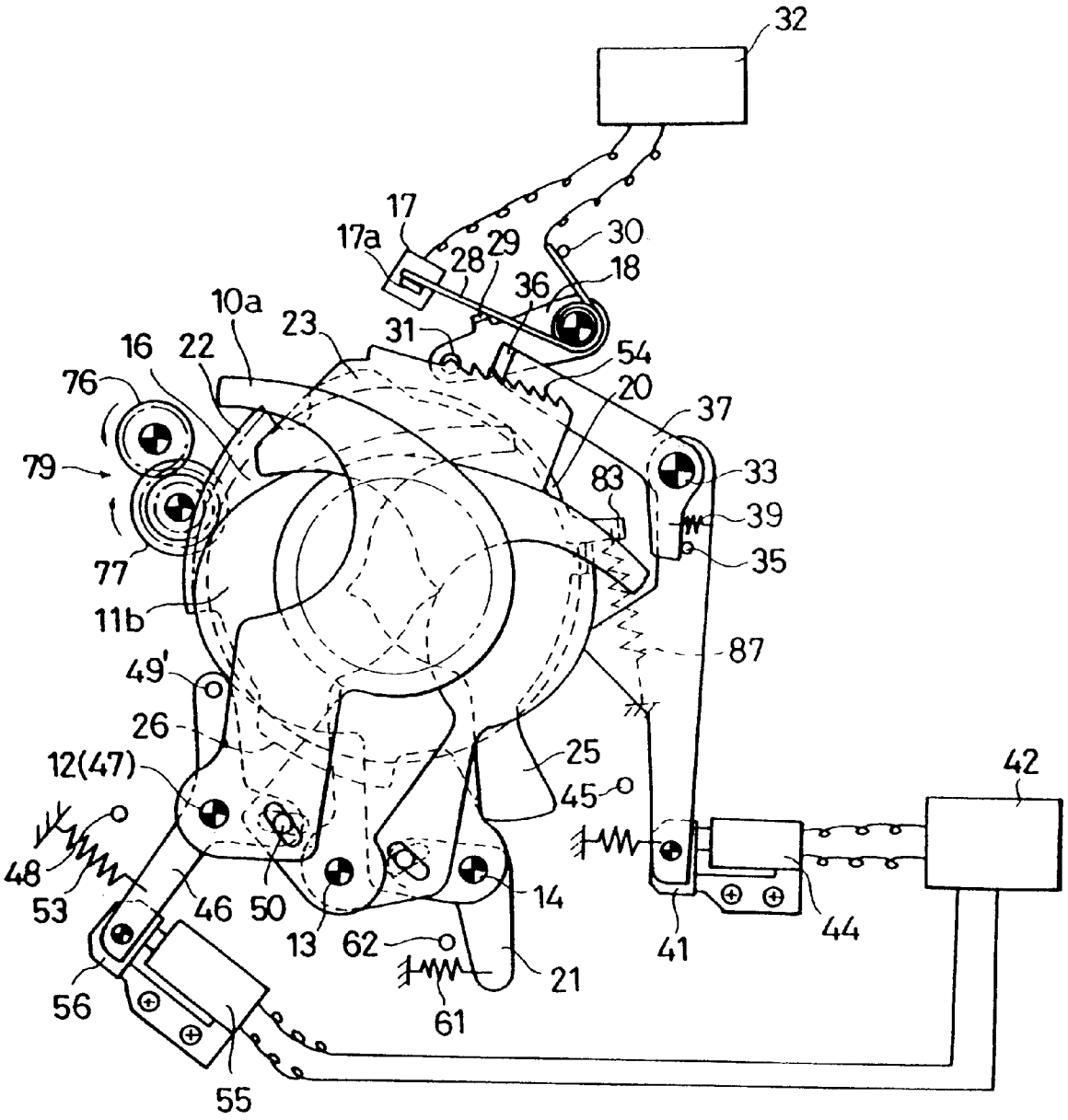

The cam portion 23 causes the abutment bar 31 to be gradually released to rotate the switch lever 18 in the counterclockwise direction by the torsion spring 28. Consequently, the one end of the torsion spring 28 comes into contact with the terminal 17*a* of the start switch 17 to turn the start switch ON (FIG. 11). During these operations caused by the rotation of the operational plate 16, the operational lever 42 does not actuate the focus adjusting lens barrel 5, since there is a predetermined distance between the operational lever 24 and the operational lever 83 of the operation ring 20.

A further rotation of the stepping motor 69 in the counterclockwise direction continues until the number of steps reaches a predetermined value corresponding to the focal position detected by the object distance detecting means 90. As a result, when the operational lever 24 of the operational plate 16 comes into contact with the operational lever 83 of the operation ring 20 from a predetermined angular position, the operation ring 20 beings rotating in the counterclockwise direction. Consequently, the operational lever 83 moves in the elongated holes 80 and 81 of the intermediate frame 65 and the motor mount 66 to rotate the focus adjusting lens barrel 5 in the same direction, so that the focus adjusting lens barrel 5 is advanced to the focal position. When the focus adjusting lens barrel 5 is moved to the focal position, the stepping motor 69 stops rotating in response to the stop signal from the motor drive control circuit 32.

Figure 12:
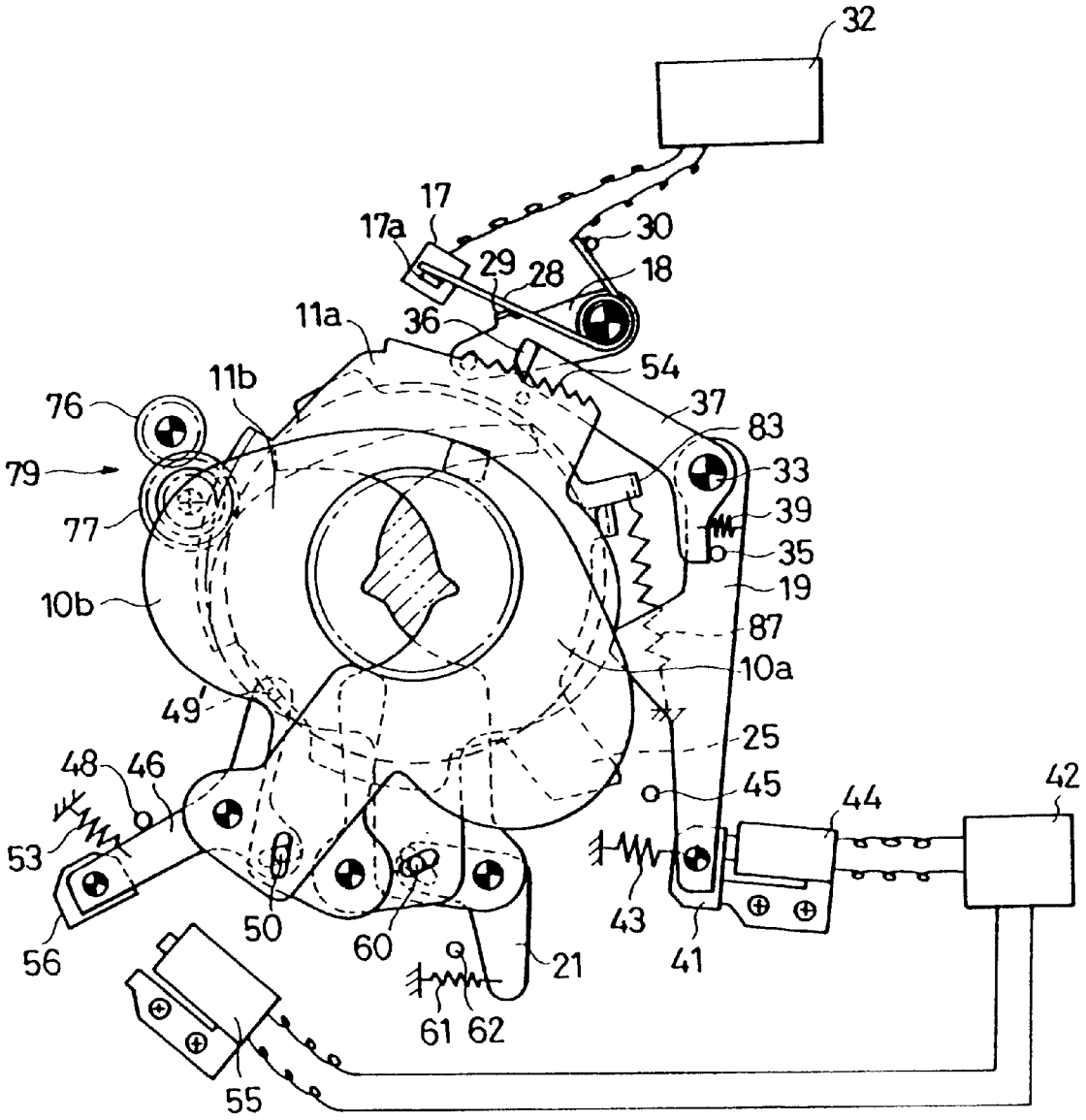

As a result, a signal is issued from the electromagnet control circuit 42 to deenergize the first electromagnet 55 thereby to release the armature 56 and accordingly the sector lever 46. Consequently, the sector lever 46 is rotated in the clockwise direction by the spring 53 (FIG. 12). The operational bar 50' is moved in the radial and outward direction of the annular base 9 to rotate the sector blades 10*a* and 10*b* in the clockwise direction and the counterclockwise direction respectively, so that the first sector mechanism 10 is fully opened. Since the second sector mechanism 11 is opened at a predetermined aperture (exposure value), as mentioned above, an exposure can be done through the first and second sector mechanisms 10 and 11.

Figure 13:
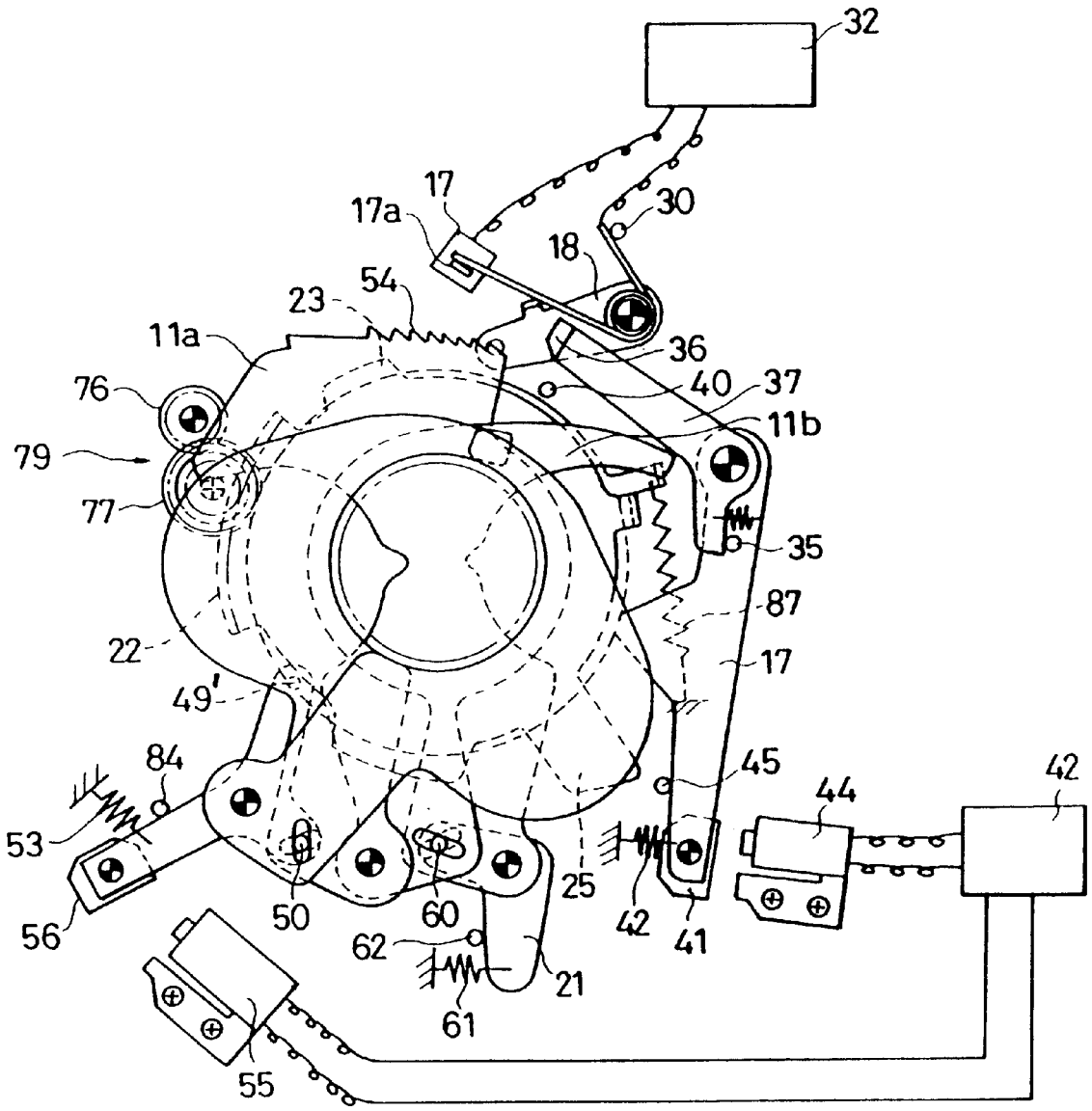
Figure 14:
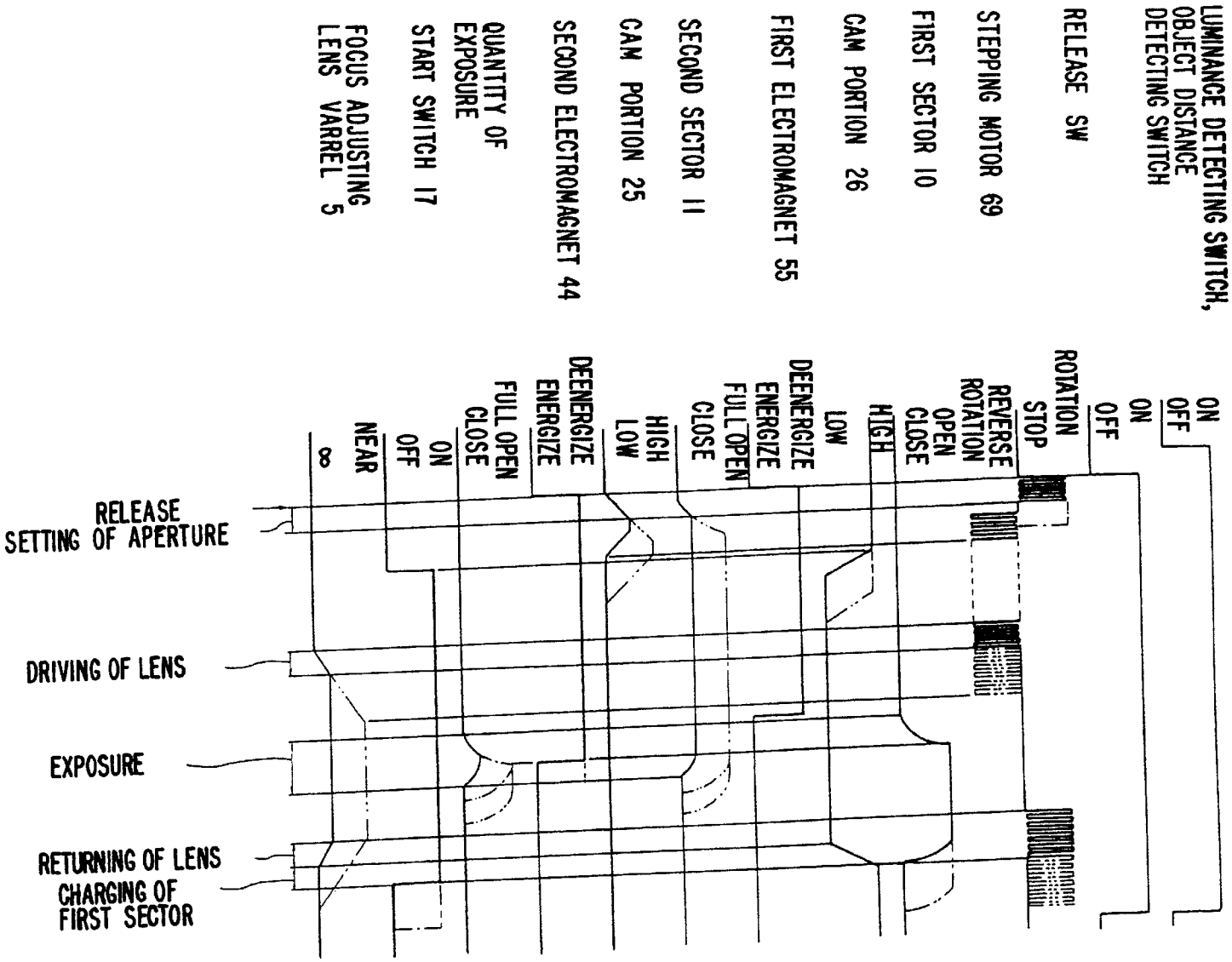
FIG. 14 is a timing chart of various elements of a shutter device according to a second embodiment of the present invention.
Figure 15:
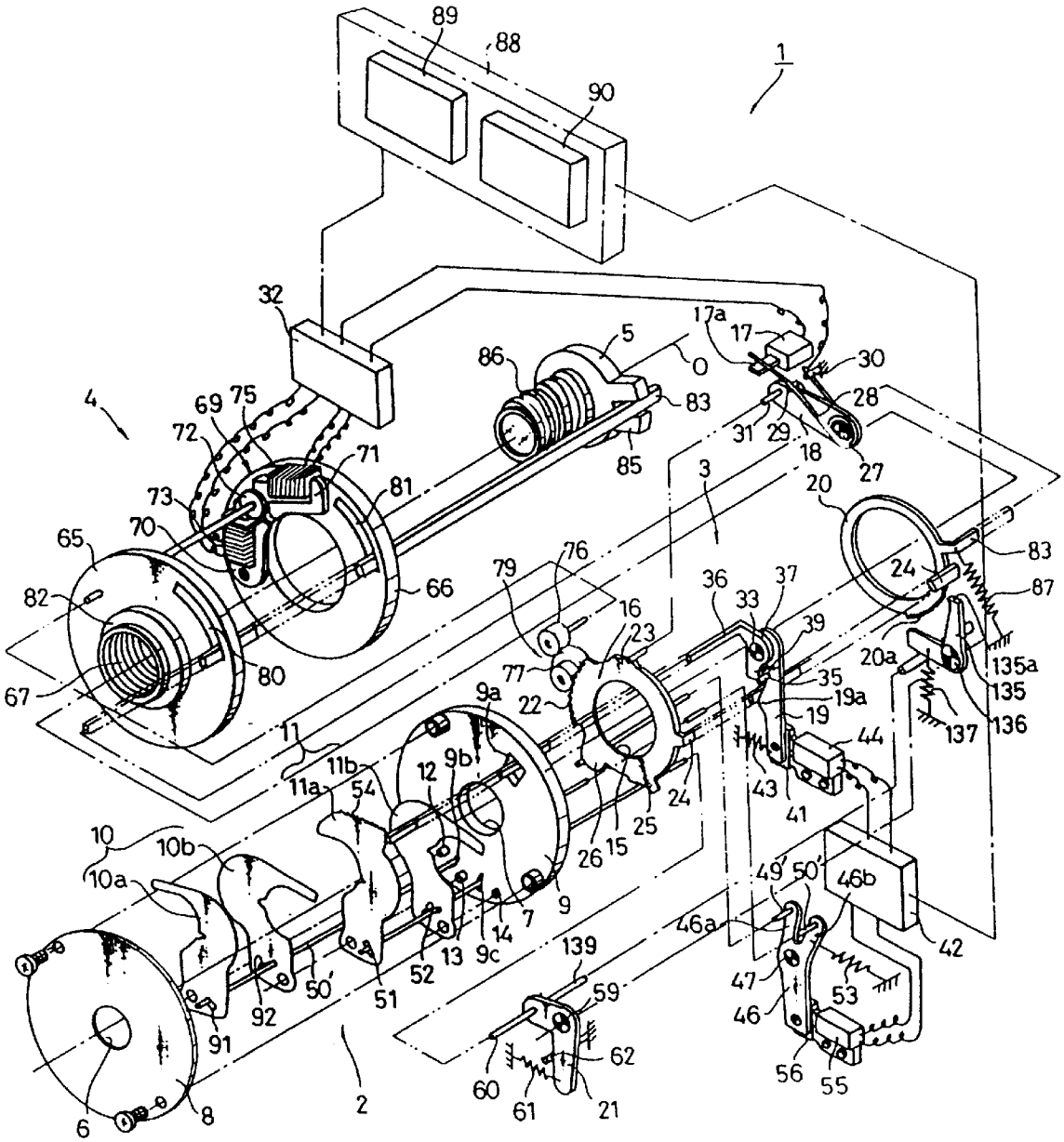
FIG. 15 is an exploded perspective view of a shutter device according to a third embodiment of the present invention.

After the lapse of a predetermined time of exposure determined by the photometer means 89, the second electromagnet 44 is deenergized in response to the signal of the electromagnet control circuit 42, so that the armature 41 and accordingly the lever member 19 are released and rotated in the clockwise direction by the spring 43. The operational member 37 is rotated in the same direction together with the lever member 19, so that the abutment lever 36 is disengaged from the ratchet teeth 54 of the sector blade 11*a* to release the sector blade 11*a* (FIG. 13).

As a result, the sector association lever 60 is rotated in the clockwise direction by the spring 61 until the sector association lever 60 comes into contact with the stop 62. Since the cam portion 25 is retracted from the sector association lever 60 by the rotation of the operational plate 16, the sector association lever 60 is moved in the radial and inward direction along the elongated hole 9*c* of the annular base 9. As a result, the sector blade 11*a* and the sector blade 11*b* are rotated in the counterclockwise direction and the clockwise direction respectively, to close the second sector mechanism 11, so that the exposure through the opening of the first sector mechanism 10 is finished. After the exposure, the stepping motor 69 rotates in the clockwise direction by a predetermined number of steps of forward rotation pulses from the motor drive control circuit 32 to rotate the operational plate 16 in the clockwise direction, so that the shutter device 1' is returned to the initial position shown in FIG. 9.

In the illustrated second embodiment, although the ratchet teeth 54 are provided only on the sector blade 11*l* that constitutes the second sector mechanism 11, it is possible to additionally provide ratchet teeth on the sector blade 11*b* to enhance the diaphragm holding effect of the abutment lever 36.

The following discussion will be directed to a third embodiment of the present invention, shown in FIGS. 15 through 29 in which the elements corresponding to those in the above mentioned first and second embodiments are designated with the same reference numerals.

One of the main features of the third embodiment is directed to the selection of a "normal photographing mode" and a "daylight synchro mode" by a mode selection switch.

The operation ring 20 is provided on its outer periphery with a ratchet teeth 20*a*. Pivoted adjacent to the operation ring 20 is a lens abutment lever 135 which has at its one end a pawl 135*a* and which is rotatable about a shaft 136. The spring 137 is provided between the opposite end of the lens abutment lever 135 and the body of the shutter device, so that the lens abutment lever 135 is rotated in the counterclockwise direction by the spring 137. The rotation of the lens abutment lever 137 is restricted by the bar member 139. The spring 137 is weaker than the spring 61. Accordingly, when the second sector lever 21 is rotated in the clockwise direction to come into contact with the positioning pin 62, the lens abutment lever 135 is pressed up by the bar member 139 at the opposite end of the lens abutment lever to rotate the latter in the same direction.

When the "normal photographing mode" is selected by the mode selection switch (not shown), the shutter device 1" operates as follows (FIGS. 16 through 22).

Figure 16:
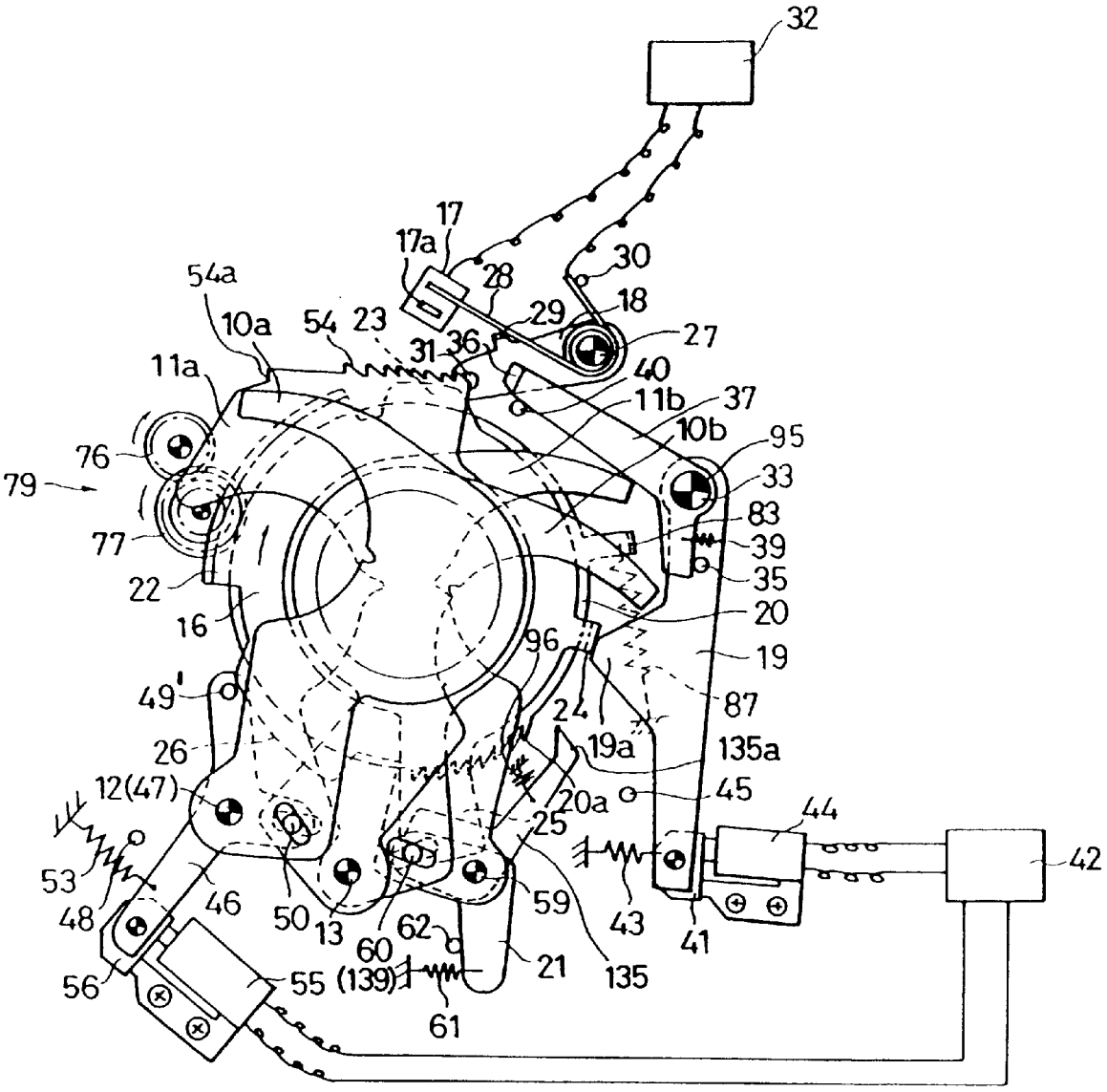
FIGS. 16 through 21 are front elevational views of a shutter device according to a third embodiment of the present invention, shown in different operational positions in a normal photographing mode.

In an initial position shown in FIG. 16 in which both the photometer switch and the object distance switch are turned OFF, the electromagnet 55 for the first sector mechanism and the electromagnet 44 for the second sector mechanism are both deenergized, and the stepping motor 69 is not driven. Namely, the operational plate 16 is maintained at the initial angular position of the normal photographing mode, and accordingly, the operational bar 49' rides on the most raised portion of the cam portion 26 to rotate the first sector lever 46 in the counterclockwise direction. As a result, the operation bar 50' is rotated in the same direction to rotate the sector blades 10*a* and 10*b* in the counterclockwise direction and the clockwise direction respectively, to close the shutter, to thereby intercept the optical path.

In this state, since the second sector opening and closing bar 60 is in contact with the lowermost portion of the cam member 25, the second sector lever 21 is rotated in the clockwise direction by the spring 61 to a position in which the angular displacement thereof is restricted by the stop 62.

Consequently, the second sector opening and closing bar 60 moves up in the elongated hole 9*c* of the annular base 9 to rotate the sector blades 11*a* and 11*b* in the counterclockwise direction and the clockwise direction respectively, to close the second sector 11.

The operational lever 24 of the operational plate 16 comes into contact with the projection 19*a* of the lever member 19, so that the lever member 19 is rotated by a predetermined angular displacement against the spring 43 in the counterclockwise direction. Consequently, the armature 41 comes into contact with the second electromagnet 44, and the abutment lever 36 is restricted by the positioning pin 40 and can engage with the ratchet teeth 54 of the sector blade 11*a*.

In this state, since there is a predetermined distance between the operational lever 24 of the operational plate 16 and the operational lever 83 of the operation ring 20, the operation ring 20 is fully rotated in the clockwise direction by the spring 87. As a result, the operational lever 83 is rotated in the same direction to come into contact with the ends of the arched grooves 80 and 81 of the intermediate frame 65 and the motor mount 66 in the clockwise direction in order to rotate the focus adjusting lens barrel 5 by the largest angular displacement in the same direction. Thus, the lens is retracted into the innermost position. The lens abutment lever 135 is rotated in the clockwise direction against the spring 137, since the second sector lever 21 is rotated in the clockwise direction until it comes into contact with the positioning pin 62. Consequently, the pawl 135*a* is located away from the ratchet teeth 20*a* of the operation ring 20.

The switch lever 18 is rotated in the clockwise direction when the abutment bar 31 rides on the most raised portion of the cam 23, so that one end (contact point) of the spring 28 separates from the terminal 17*a* to keep the start switch 17 turned OFF.

When the photometer switch and the object distance switch are turned ON, the arithmetic operation circuit 88 operates, so that the luminance data and the object distance data are arithmetically calculated by the luminance detecting means 89 and the object distance detecting means 90, respectively.

When the release switch is turned ON, a predetermined number of forward rotation pulses corresponding to the object luminance is sent to the stepping motor 69 from the motor drive control circuit 32 in accordance with the luminance data of the photometer means 89 to rotate the stepping motor 69 in the forward direction (clockwise direction). At the same time, the second electromagnet 44 (for the sector mechanism) is energized in response to the signal from the electromagnet control circuit 42 in accordance with the arithmetic operation circuit 88 to attract the armature 41. Similarly, the first electromagnet 55 is energized to attract the armature 56. As a result, the lever member 19 is attracted at the opposite end thereof, so that it can not be rotated in the clockwise direction, even if the projection 19*a* is released from the operational lever 24. Similarly, the opposite end of the first sector mechanism lever 46 is attracted, so that it can not be rotated in the clockwise direction even if the operational bar 49' is disengaged from the cam portion 26. Simultaneously, the stepping motor 69 receives a predetermined number of steps of forward rotation pulses corresponding to the diaphragm value detected, based on the photometer data, so that the coils 73 and 75 are activated to rotate the rotor 72 in the clockwise direction.

When the rotor 72 causes the operational plate 16 to rotate in the clockwise direction through the reduction gear train 79, the cam portion 25 gradually pushes the second sector opening and closing bar 60 downward. As a result, the second sector opening and closing bar 60 is moved radially and outwardly in the elongated hole 9*c* of the annular base 9 to rotate the sector blade 11*a* and the sector blade 11*b* in the clockwise direction and the counterclockwise direction, respectively. The lens abutment lever 135 rotates in the counterclockwise direction in association with the movement of the bar member 139, and accordingly, the pawl 135*a* comes into contact with a portion of the operation ring 20 other than the ratchet teeth 20*a*.

Figure 17:
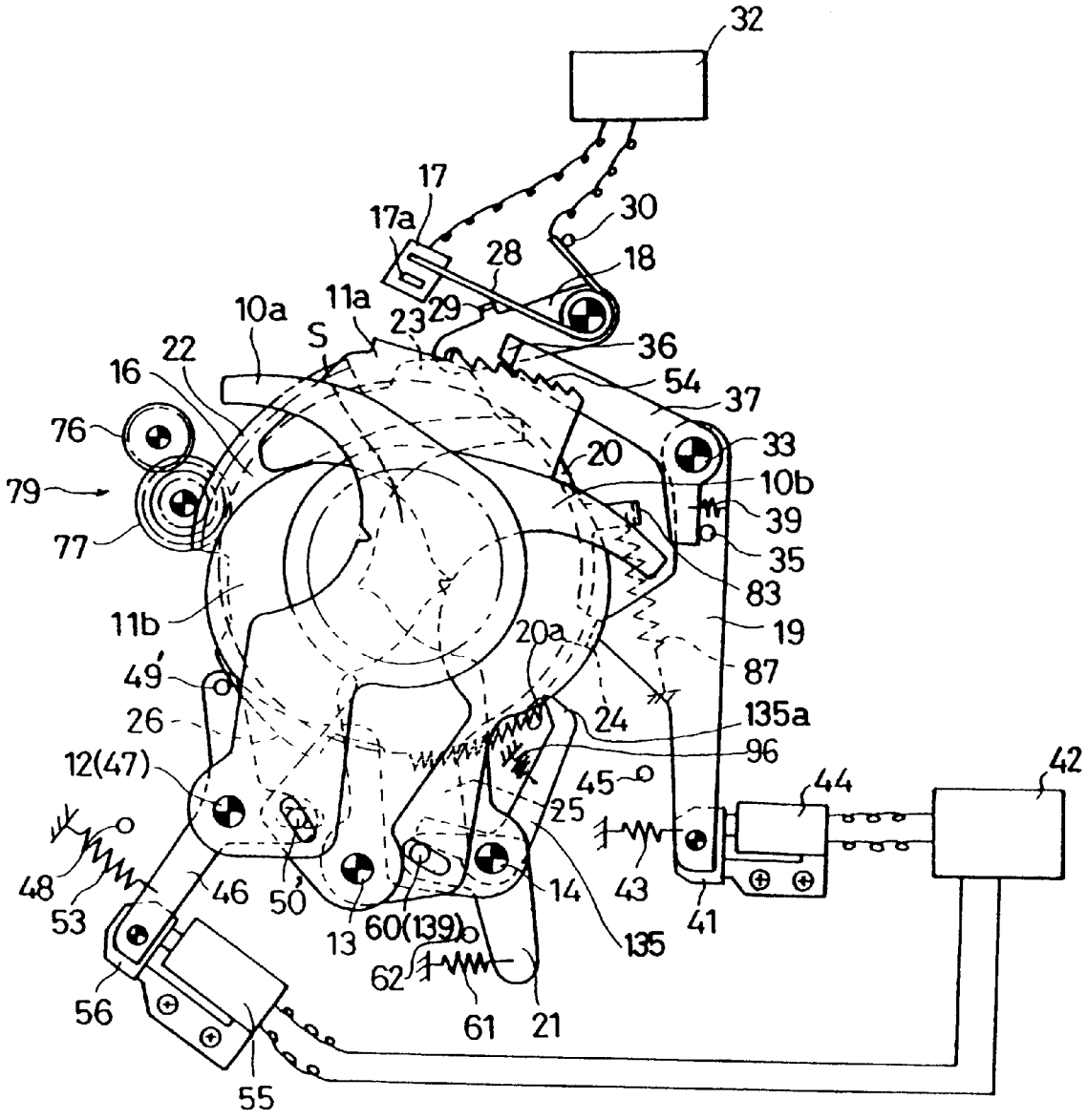

When the rotor 72 is stopped after it rotates by a predetermined number of steps, the second sector mechanism 11 defines an opening (aperture) S corresponding to a desired exposure value, as shown in FIG. 17. The abutment lever 36 rides on the ratchet teeth 54 tooth by tooth. When the operational plate 16 stops, the abutment lever 36 is locked to hold the second sector mechanism 11 at the open position and to determine the diaphragm value. In this state, since the first sector mechanism 10 is maintained in a closed position, the shutter opening 6 is closed, so that no exposure takes place.

Thereafter, a predetermined number of steps of reverse rotation pulses are generated from the motor drive control circuit 32 to the stepping motor 69 to reverse the rotor 72 in the counterclockwise direction, thereby to rotate the operational plate 16 in the counterclockwise direction through the reduction gear train 79. As a result, the operational bar 49' is gradually disengaged from the cam portion 26. Nevertheless, no rotation of the first sector mechanism lever 46 in the clockwise direction occurs, since the armature 56 is attracted by the first electromagnet 55. Thus, the first sector mechanism 10 is kept in the closed position.

Figure 18:
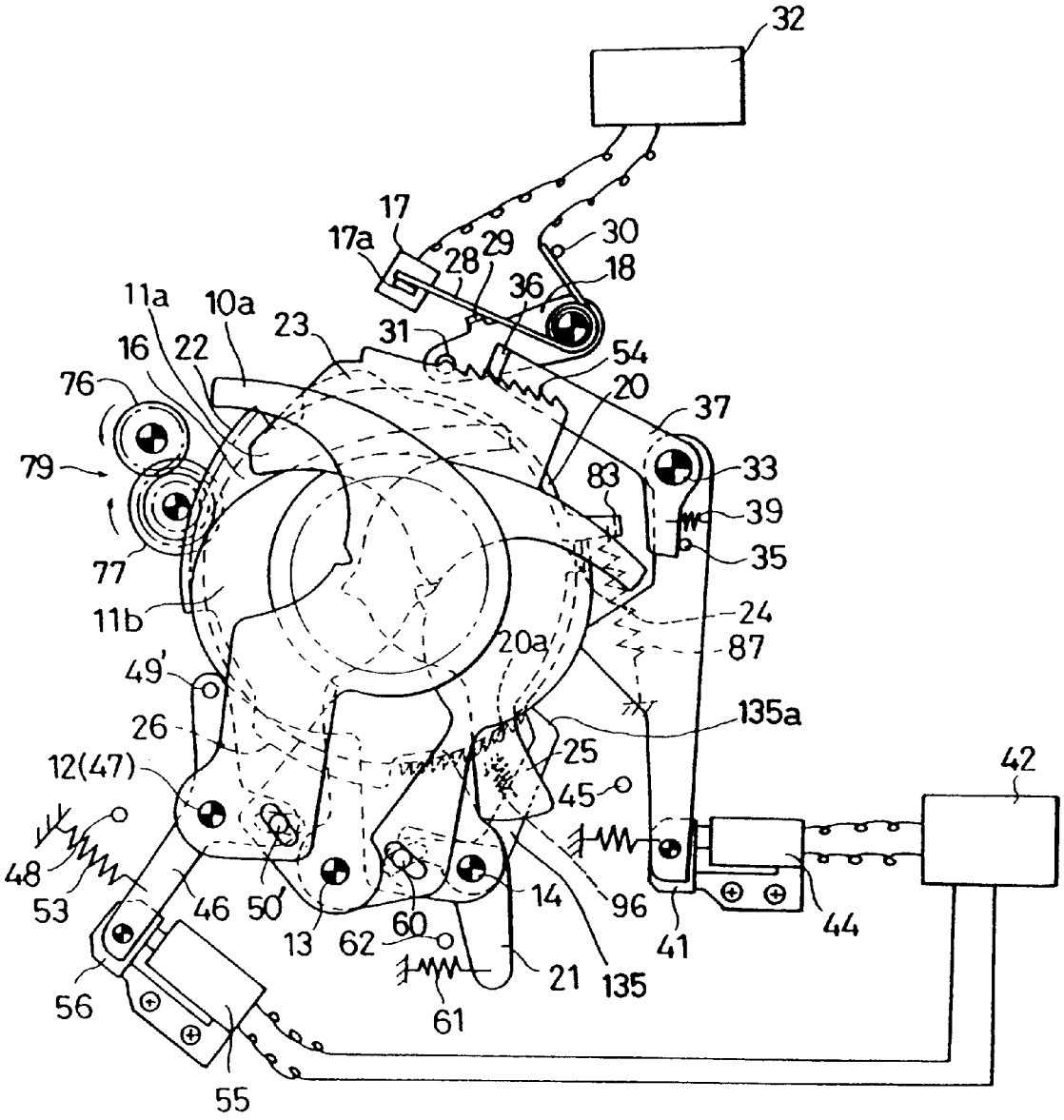
Figure 19:
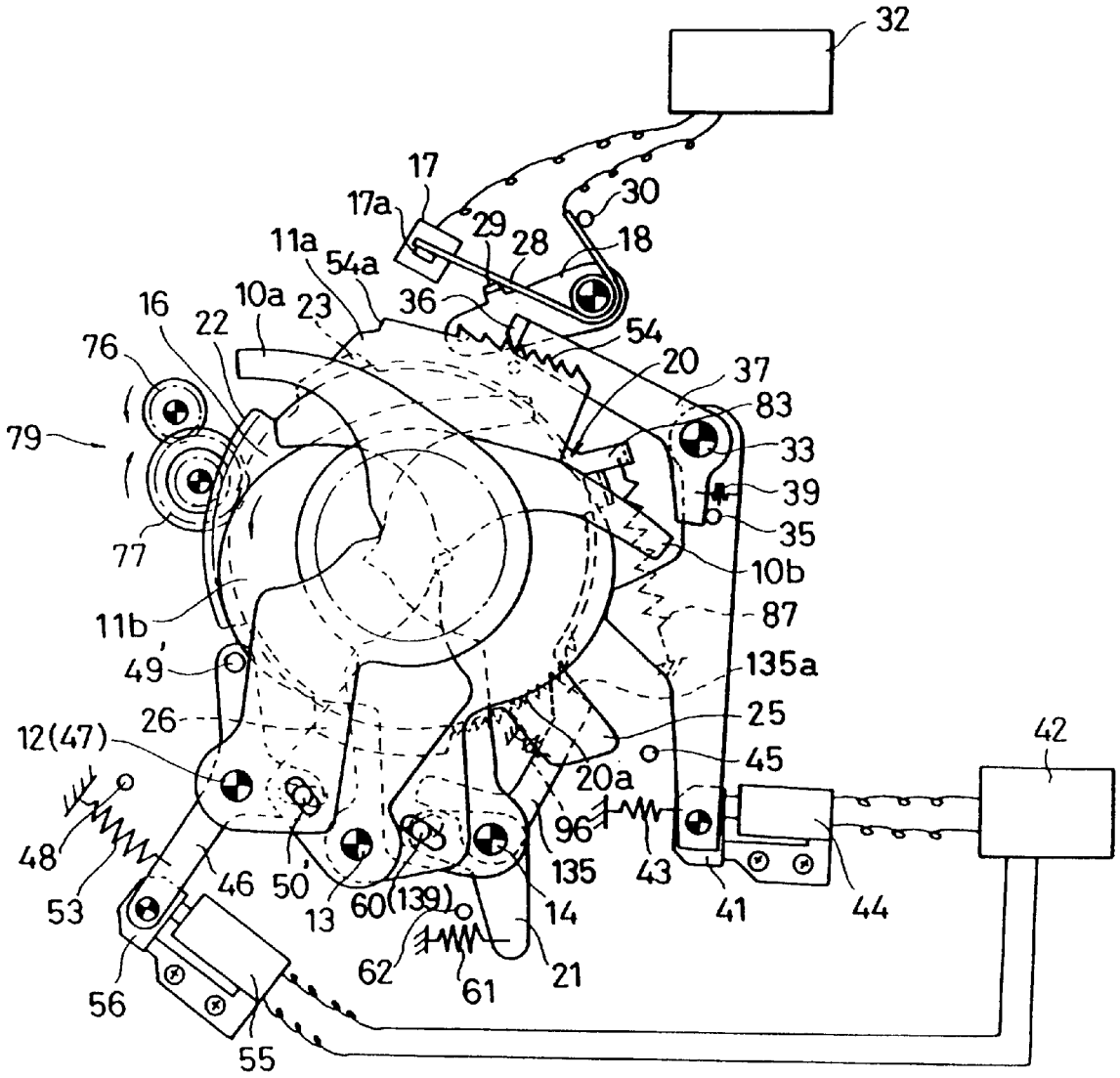

The cam portion 23 causes the abutment bar 31 to be gradually released therefrom to rotate the switch lever 18 in the counterclockwise direction by the torsion spring 28. Consequently, the one end of the torsion spring 28 comes into contact with the terminal 17*a* of the start switch 17 to turn the start switch ON (FIG. 18). During these operations caused by the rotation of the operational plate 16, the operational lever 24 does not actuate the focus adjusting lens barrel 5, since there is a predetermined distance between the operational lever 24 and the operational lever 83 of the operation ring 20.

A further rotation of the stepping motor 69 in the counterclockwise direction continues until the number of steps reaches a predetermined value corresponding to the focus position detected by the object distance detecting means 90. As a result, when the operational lever 24 of the operational plate 16 comes into contact with the operational lever 83 of the operation ring 20 from a predetermined angular position, the operation ring 20 begins rotating in the counterclockwise direction. Consequently, the operational lever 83 moves in the elongated holes 80 and 81 of the intermediate frame 65 and the motor mount 66 to rotate the focus adjusting lens barrel 5 in the same direction, so that the focus adjusting lens barrel 5 is advanced to the focus position. The pawl 135*a* of the lens abutment lever 135 rides over the ratchet teeth 20*a* tooth by tooth and engages with one of the ratchet teeth when operation ring 20 stops to lock the operation ring 20 and accordingly the focus adjusting lens barrel 5 at the focus position.

Figure 20:
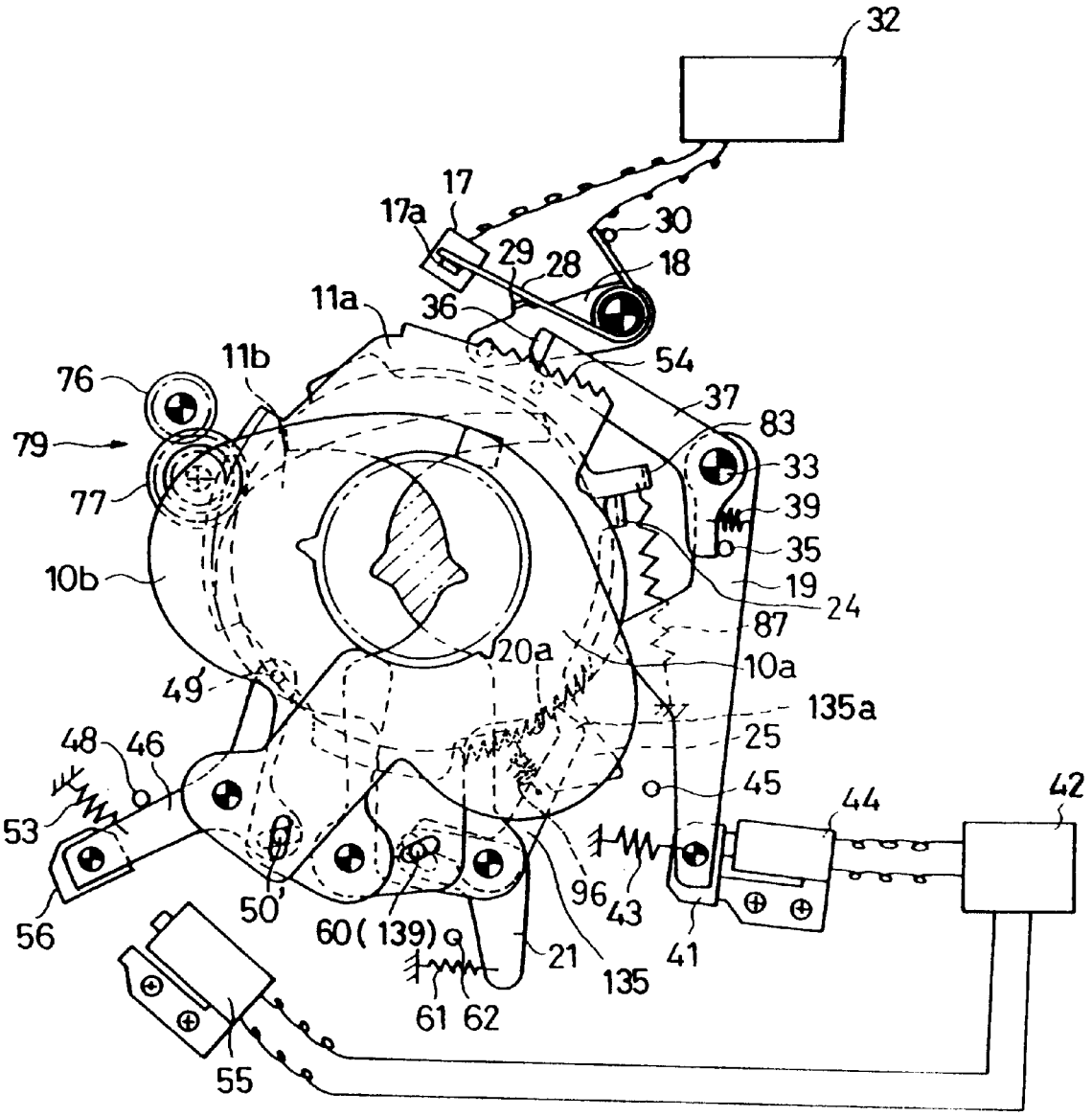

Thereafter, a signal is issued from the electromagnet control circuit 42 to deenergize the first electromagnet 55, thereby to release the armature 56 and accordingly the sector lever 46. Consequently, the sector lever 46 is rotated in the clockwise direction by the spring 53 (FIG. 20). The operational bar 50' is moved in the radial and outward direction of the annular base 9 to rotate the sector blades 10*a* and 10*b* in the clockwise direction and the counterclockwise direction respectively, so that the first sector mechanism 10 is fully opened. Since the second sector mechanism 11 is opened to a predetermined aperture (exposure value), as mentioned above, an exposure can be made through the first and second sector mechanisms 10 and 11.

Figure 21:
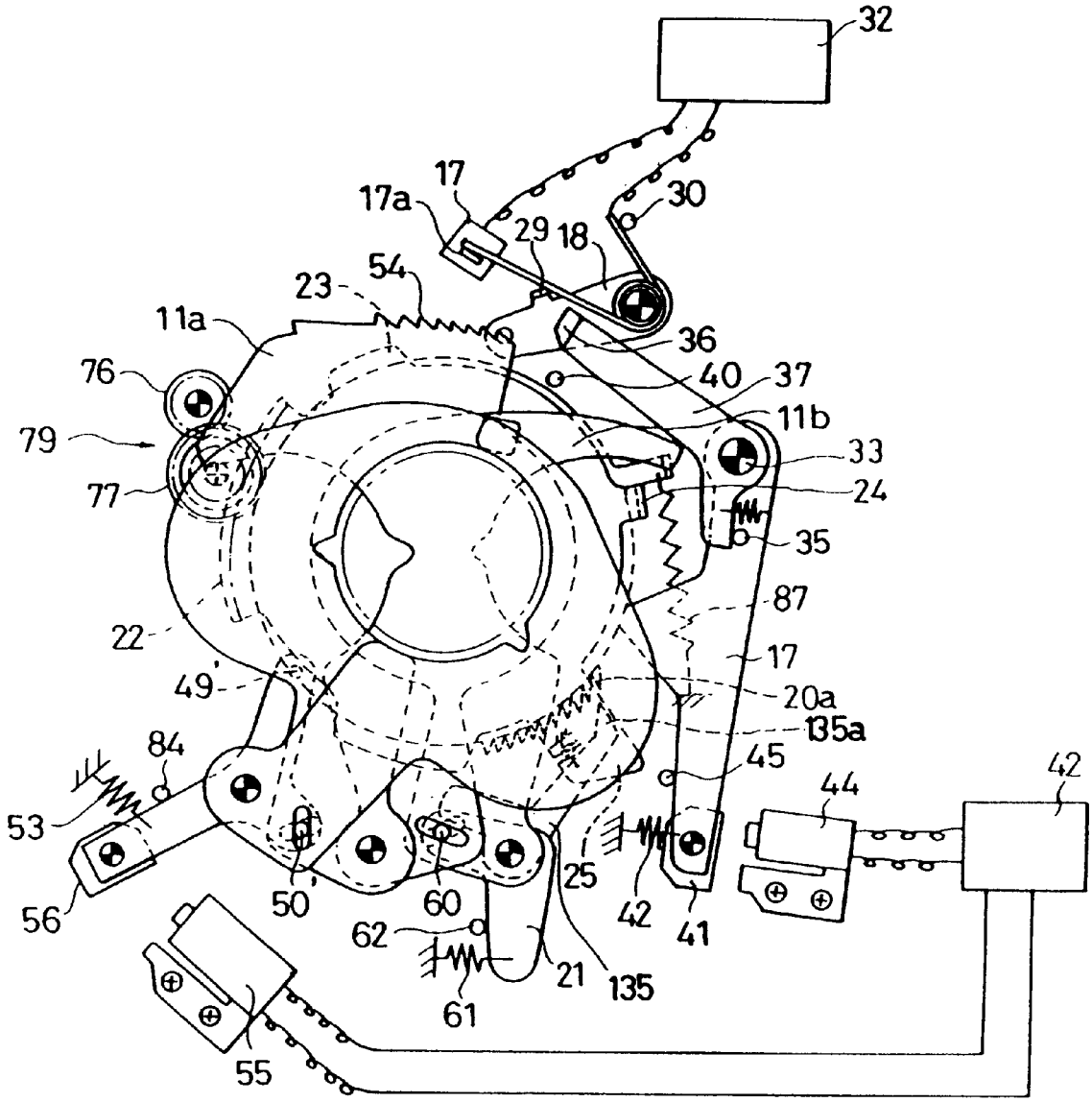
Figure 22:
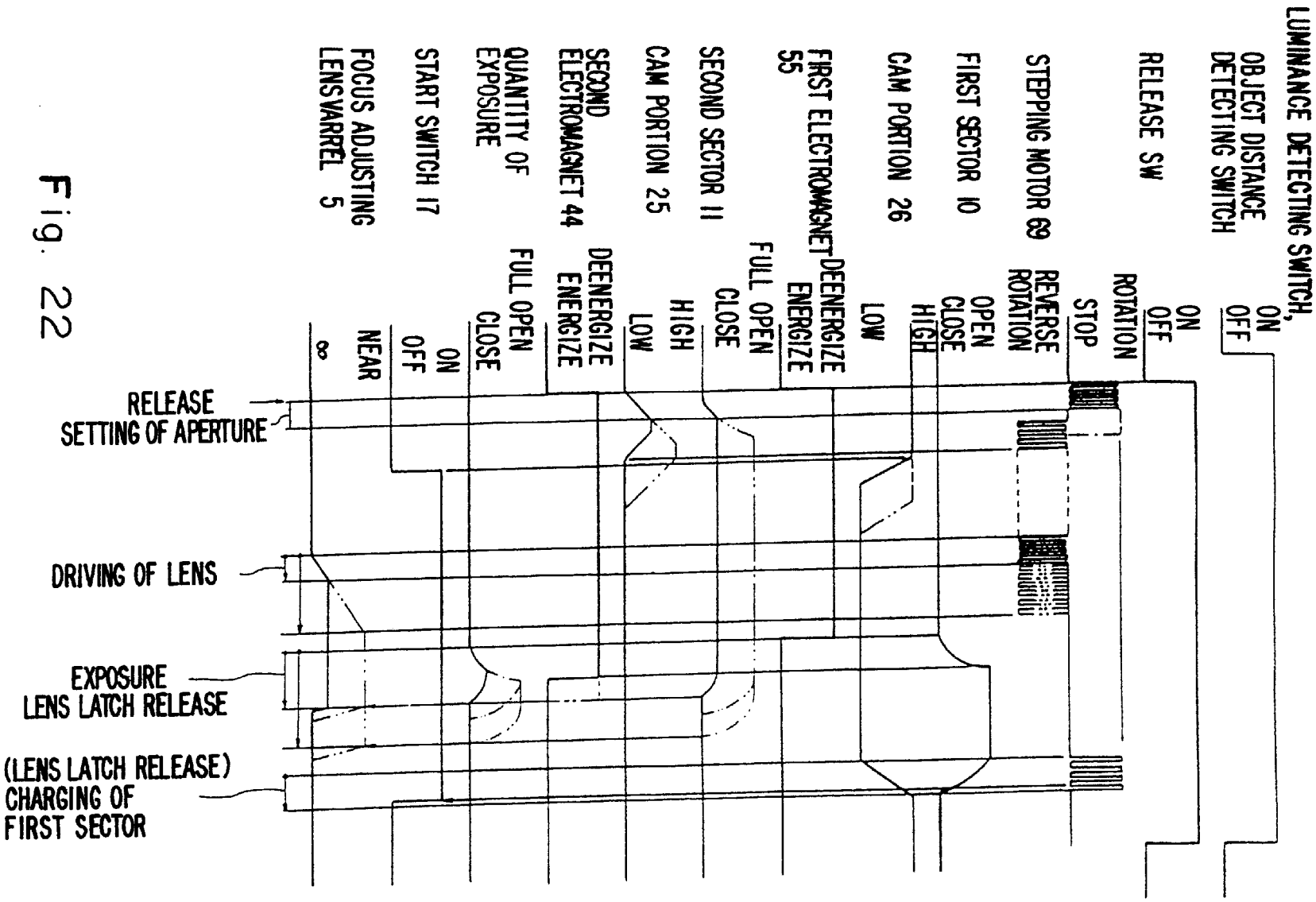
FIG. 22 is a timing chart of various elements of a shutter device according to a third embodiment of the present invention.

After the lapse of a predetermined exposure time as determined by the photometer means 89, the second electromagnet 44 is deenergized in response to the signal of the electromagnet control circuit 42, so that the armature 41, and accordingly, the lever member 19 are released and rotated in the clockwise direction by the spring 43. The operational member 37 is rotated in the same direction together with the lever member 19, so that the abutment lever 36 is disengaged from the ratchet teeth 54 of the sector blade 11*a* to release the sector blade 11*a*. As a result, the second sector opening and closing lever 60 is rotated in the clockwise direction by the spring 61 until the lever 60 comes into contact with the stop pin 62. Since the cam portion 25 is retracted from the sector association lever 60 by the rotation of the operational plate 16, the sector association lever 60 is moved in the radial and inward direction along the elongated hole 9*c* of the annular base 9. As a result, the sector blade 11*a* and the sector blade 11*b* are rotated in the counterclockwise direction and the clockwise direction respectively, to close the second sector mechanism 11, so that the exposure through the opening of the first sector mechanism 10 is finished (FIG. 21). In this time, since the lens abutment lever 135 is rotated in the same direction by the bar member 139 which moves in the clockwise direction to press the opposite end of the lens abutment lever 135 upward, the pawl 135*a* is disengaged from the ratchet teeth 20*a* to release the operation ring 20. As a result, the operation ring 20 is rotated in the clockwise direction by the spring 87 to return the focus adjusting lens barrel 5 to the initial position.

After the exposure, the stepping motor 69 rotates in the clockwise direction by a predetermined number of steps of forward rotation pulses from the motor drive control circuit 32 to rotate the operational plate 16 in the clockwise direction. As a result, the operational bar 49' of the first sector lever 46 rides on the most raised portion of the cam 26 of the operational plate 16, and accordingly, the first sector 10 is closed again. Thus, the shutter device 1" is returned to the initial position shown in FIG. 16. Immediately before the completion of the charge of the first sector 10, the abutment bar 31 is placed on the cam 23, so that the spring 28 is separated from the terminal 17*a* to turn the start switch OFF.

When the "daylight synchro" mode is selected by the mode selection switch (not shown), the shutter device 1" operates as follows (FIGS. 23 through 29).

In an initial position in which both the photometer switch and the object distance switch are turned OFF, the shutter device 1" is as shown in FIG. 16. When the photometer switch and the object distance switch are turned ON, the arithmetic operation circuit 88 operates, so that the luminance data and the object distance data are arithmetically calculated by the luminance detecting means 89 and the object distance detecting means 90, respectively.

When the release switch is turned ON, the stepping motor 69 rotates by a predetermined number of steps in the forward direction, in accordance with the motor drive control circuit 32. At the same time, the second electromagnet 44 (for the second sector mechanism) is energized in response to the signal from the electromagnet control circuit 42 in accordance with the arithmetic operation circuit 88 to attract the armature 41. Similarly, the first electromagnet 55 is energized to attract the armature 56. As a result, the lever member 19 is attracted at the opposite end thereof, so that it can be rotated in the clockwise direction, even if the projection 19*a* is released from the operational lever 24. Similarly, the opposite end of the first sector mechanism lever 46 is attracted, so that it can not be rotated in the clockwise direction even if the operational bar 49' is disengaged from the cam portion 26.

Figure 23:
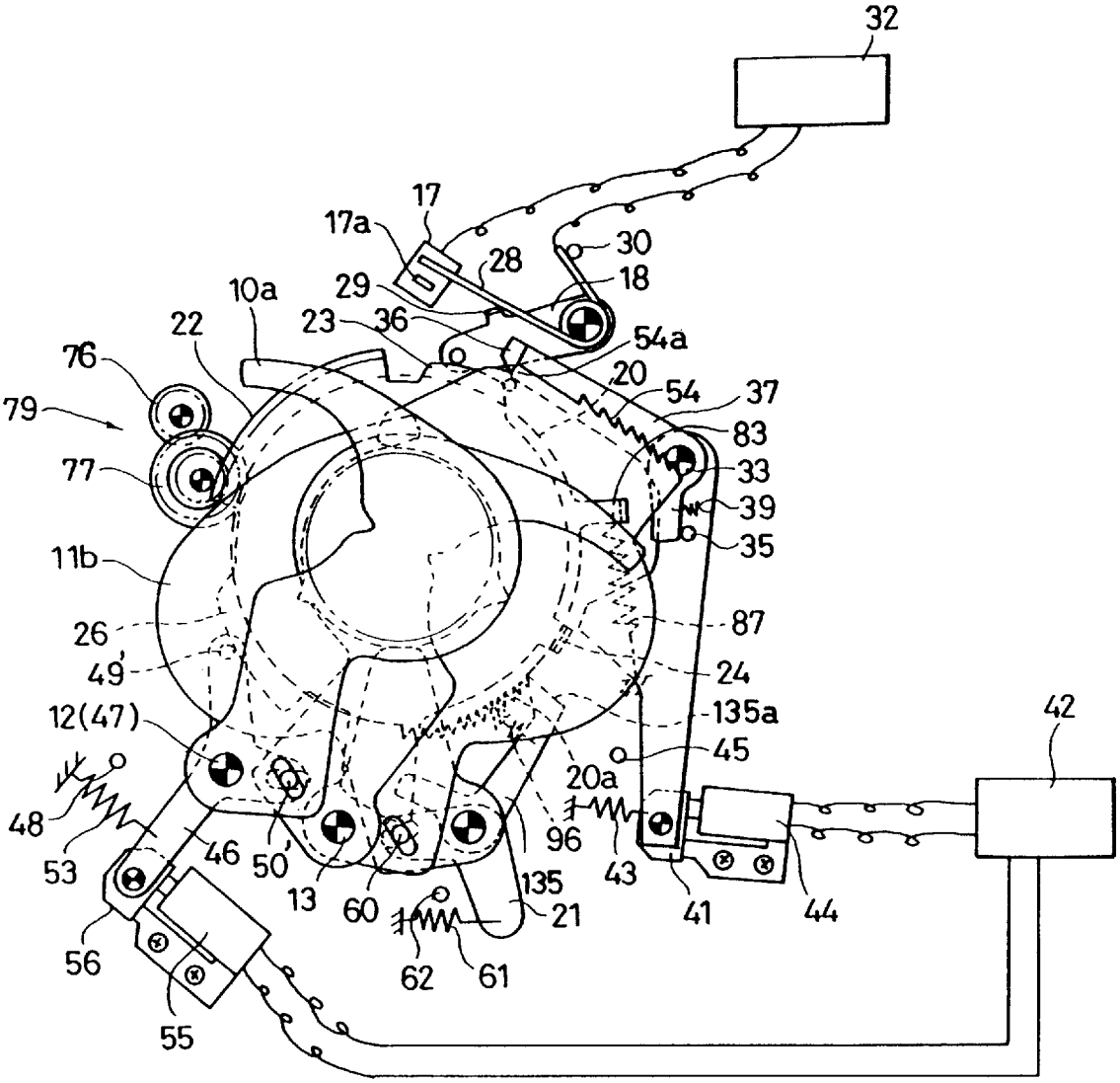
FIGS. 23 through 28 are front elevational views of a shutter device according to a third embodiment of the present invention, shown in different operational positions in a daylight synchro mode; and, FIG. 29 is a timing chart of various elements of a shutter device according to a third embodiment of the present invention, in a daylight synchro mode.

When the stepping motor 69 rotates by a predetermined number of steps in the forward direction to rotate the operational plate 16 in the clockwise direction through the reduction gear train 79, the cam portion 25 gradually pushes the second sector opening and closing bar 60 downward. As a result, the second sector opening and closing bar 60 is fully moved in the radial and outward direction in the elongated hole 9*c* of the annular base 9 to rotate the sector blade 11*a* and the sector blade 11*b* in the clockwise direction and the counterclockwise direction, respectively. The abutment lever 36 rides over the ratchet teeth 54 tooth by tooth and engages with the engaging tooth 54*a* when the largest angular displacement of the sector blade 11*a* in the clockwise direction takes place to hold the second sector mechanism 11 at the full open position (FIG. 23).

The stepping motor 69 is then stopped. In this state, since the first sector 10 is kept in the closed position, no exposure occurs. The lens abutment lever 135 is rotated in the counterclockwise direction by the movement of the second sector opening and closing bar 60, so that the pawl 135*a* engages with the portion of the operation ring 20 other than the ratchet teeth 20*a*.

Thereafter, a predetermined number of steps of reverse rotation pulses are generated from the motor drive control circuit 32 to the stepping motor 69 to reverse the rotor 72 in the counterclockwise direction, thereby to rotate the operational plate 16 in the counterclockwise direction through the reduction gear train 79. As a result, the operational bar 49' is generally disengaged from the cam portion 26. Nevertheless, no rotation of the first sector mechanism lever 46 in the clockwise direction occurs, since the armature 56 is attracted by the first electromagnet 55. Thus, the first sector mechanism 10 is kept in the closed position.

Figure 24:
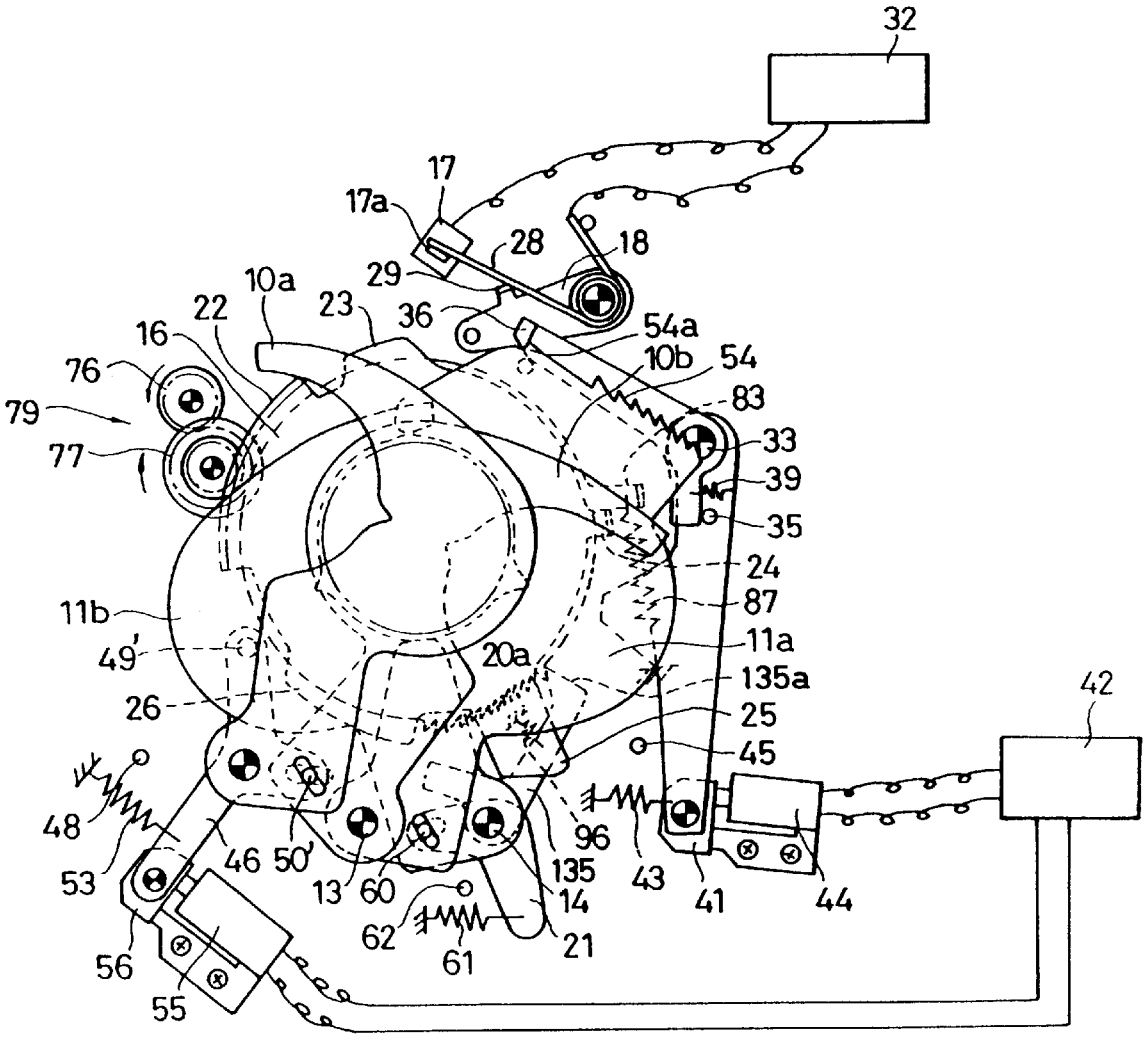

The cam portion 23 causes the abutment bar 31 to be gradually released therefrom by the rotation of the operational plate 16 to rotate the switch lever 18 in the counterclockwise direction by the torsion spring 28. Consequently, the one end of the torsion spring 29 comes into contact with the terminal 17*a* of the start switch 17 to turn the start switch ON (FIG. 24). During these operations caused by the rotation of the operational plate 16, the operational lever 24 does not actuate the focus adjusting lens barrel 5, since there is a predetermined distance between the operational lever 24 and the operational lever 83 of the operation ring 20.

Figure 25:
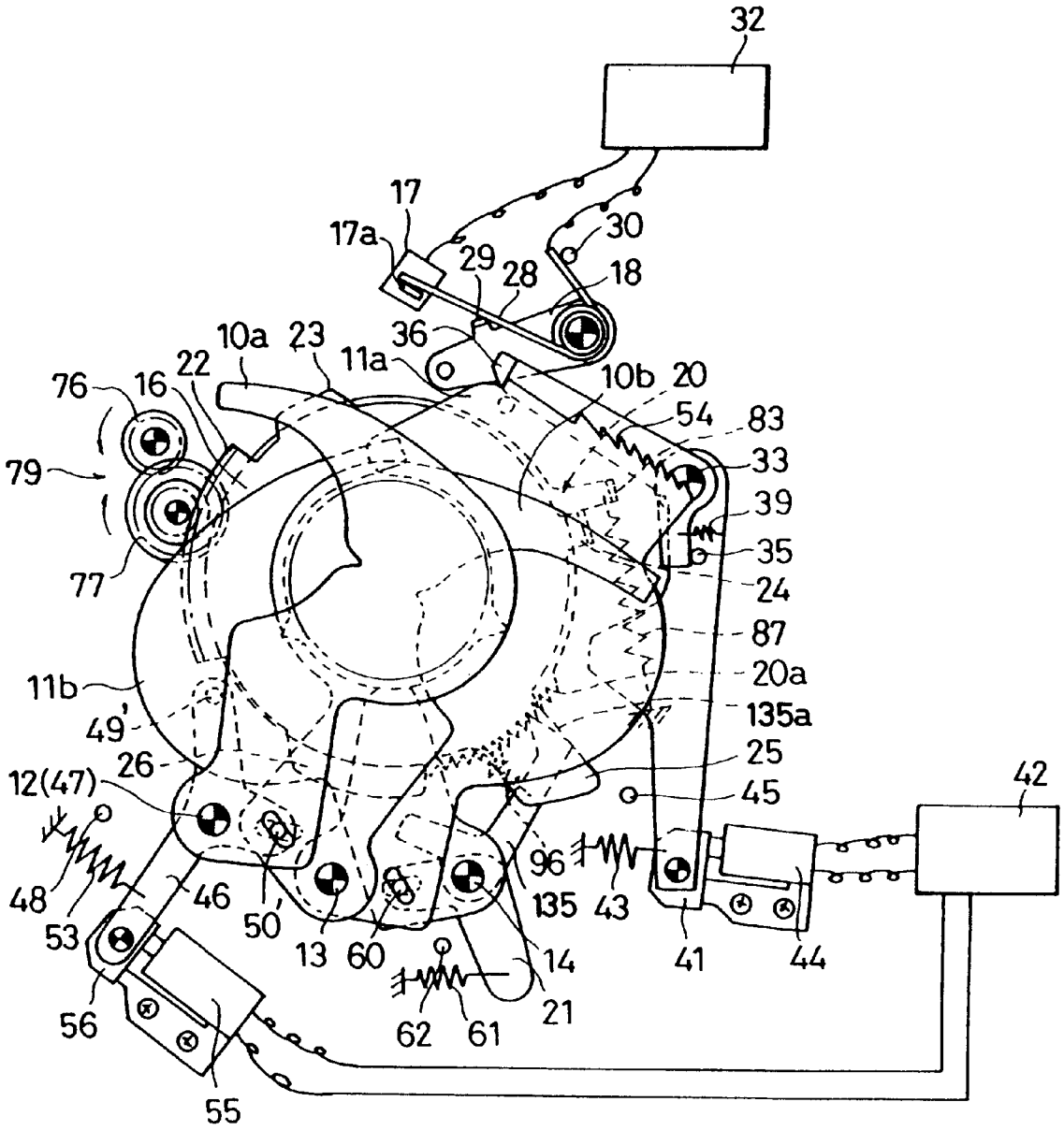

A further rotation of the stepping motor 69 in the counterclockwise direction continues until the number of steps reaches a predetermined value corresponding to the focal position detected by the object distance detecting means 90. As a result, when the operational lever 24 of the operational plate 16 comes into contact with the operational lever 83 of the operation ring 20 from a predetermined angular position, the operation ring 20 begins rotating in the counterclockwise direction (FIG. 25). Consequently, the operational lever 83 moves in the elongated holes 80 and 81 of the intermediate frame 65 and the motor mount 66 to rotate the focus adjusting lens barrel 5 in the same direction, so that the focus adjusting lens barrel 5 is advanced to the focus position. When the focus adjusting lens barrel 5 is moved to the focus position, the stepping motor 69 stops rotating, in response to the stop signal from the motor drive control circuit 32. The pawl 135*a* of the lens abutment lever 135 rides over the ratchet teeth 20*a* tooth by tooth and engages with one of the ratchet teeth when operation ring 20 stops to lock the operation ring 20 and accordingly the focus adjusting lens barrel 5 at the focus position.

Figure 26:
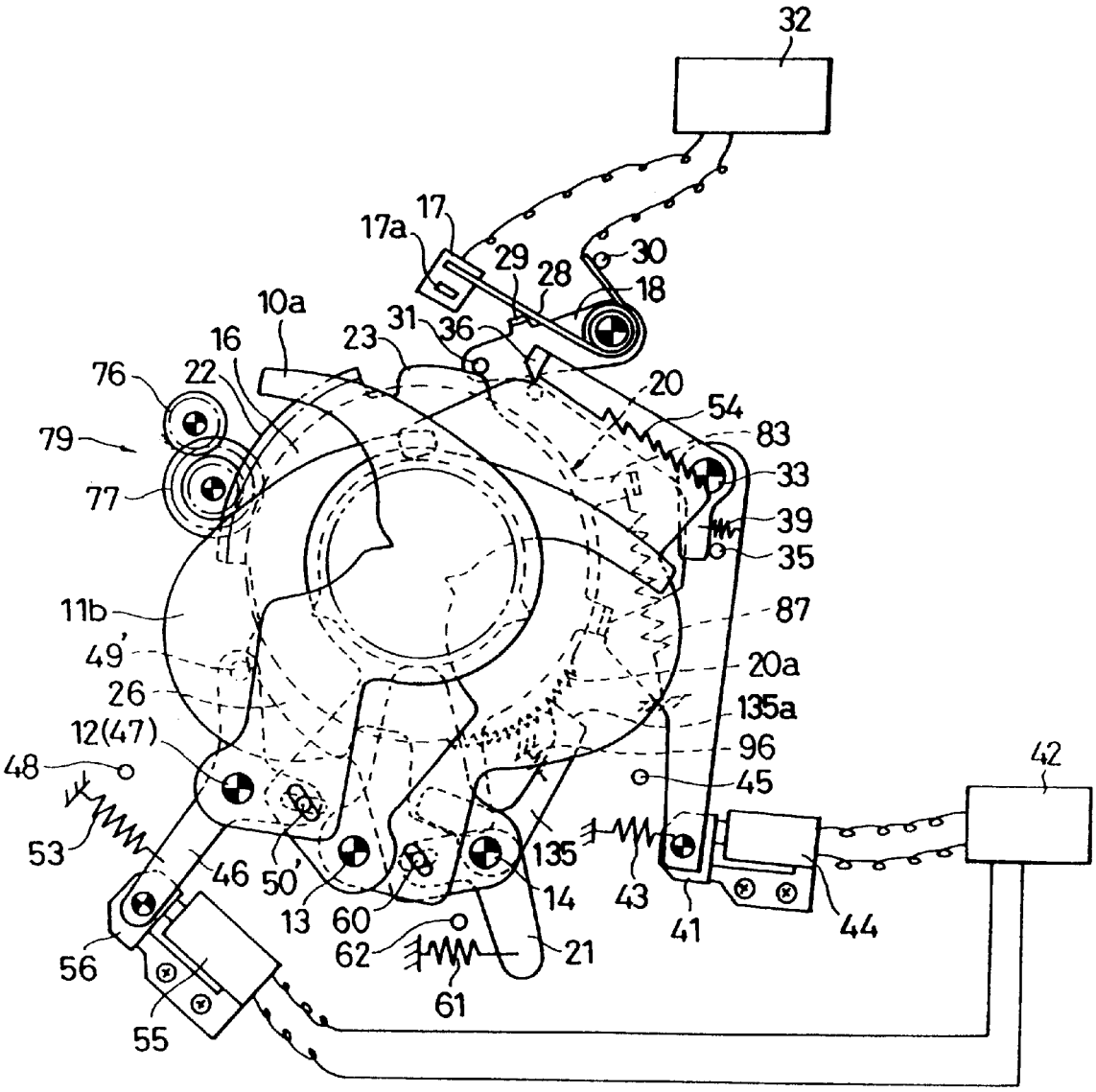

Thereafter, the stepping motor 69 rotates in the forward direction by a predetermined number of steps to rotate the operational plate 16 in the clockwise direction (FIG. 26). After the forward rotation of the stepping motor 69 by a predetermined number of steps, the stepping motor 69 is stopped again, so that the abutment bar 31 rides over the cam portion 23 to turn the start switch 17 OFF, and accordingly, the operational bar 49' rides over the cam portion 26.

Figure 27:
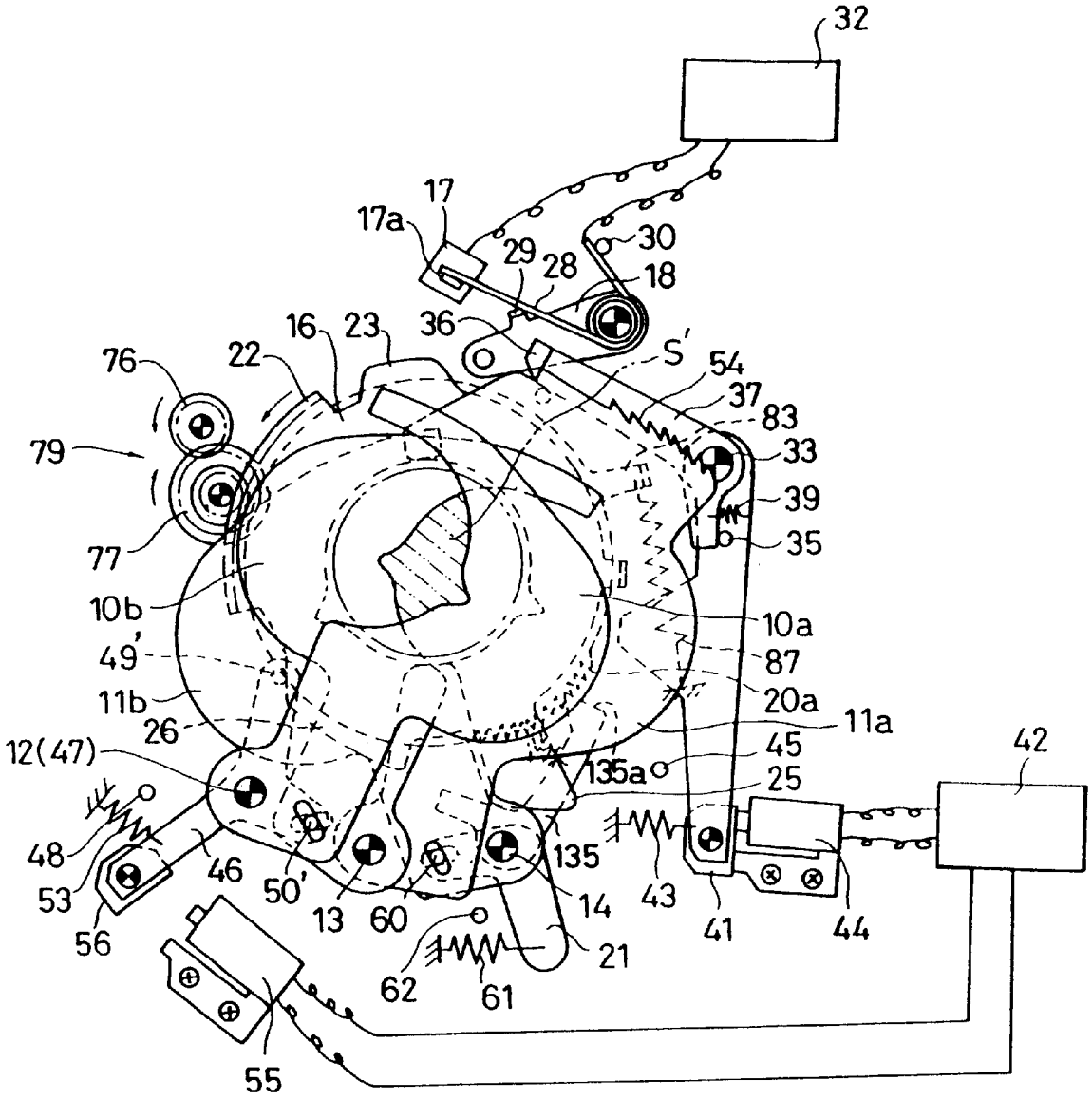

Thereafter, a signal is issued from the electromagnet control circuit 42 to deenergize the first electromagnet 55. In this state, since the operational bar 49' is located on the most raised portion of the cam portion 26 of the operational plate 16, the state is maintained. Furthermore, the operation ring 20 is not returned to the initial position, since the lens abutment lever 135 engages with the ratchet teeth 20*a*. After that, the motor drive control circuit 32 generates a predetermined number of steps of pulses to set a predetermined diaphragm value determined by the object distance data and the strobe guide number. In response thereto, the stepping motor 69 reverses to move the operational bar 49', which first comes into slide contact with the cam portion 26 and then comes away therefrom toward a lower position. As a result, the first sector lever 46 is rotated in the clockwise direction by the spring 53. Accordingly, the sector blades 10*a* and 10*b* are rotated in the clockwise direction and the counterclockwise direction to gradually close the first sector 10 (FIG. 27). Thus, the light path which has been intercepted is gradually opened to effect the exposure.

The first sector 10 is opened to a predetermined aperture corresponding to a predetermined exposure value by the reverse rotation of the stepping motor 69 through a predetermined number of steps. The synchro switch (not shown) which constitutes a daylight synchro trigger means is turned ON synchronously with a pulse immediately before a specific pulse at which the aperture becomes a predetermined value to emit strobe light in accordance with the trigger signal thereof.

At the "daylight synchro mode", the position of the object to be photographed is determined in accordance with the object distance data, and the appropriate proper diaphragm value is determined in accordance with the strobe guide number. In case of a close object distance, since the diaphragm aperture which is defined by the reverse rotation of the stepping motor 69 is smaller than an open diaphragm value, the reverse rotation of the stepping motor 69 continues after the strobe light is emitted to increase the aperture defined by the first sector 10. When the diaphragm value becomes a predetermined value which gives a desired exposure value of the background of the object, the stepping motor 69 is stopped in accordance with the stop signal of the motor drive control circuit 32. The opening (aperture) thus obtained is represented by S' in FIG. 27.

Figure 28:
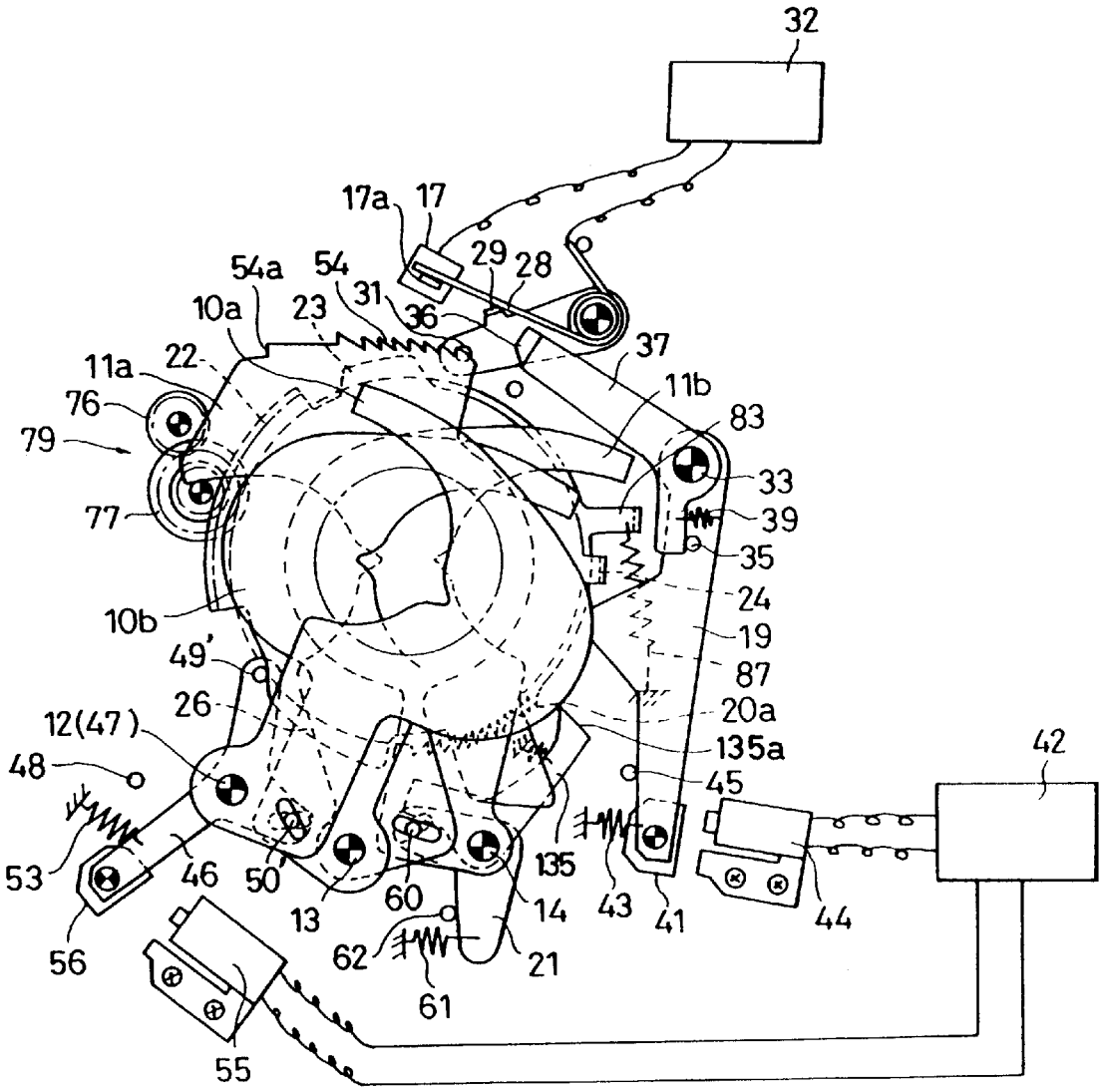
Figure 29:
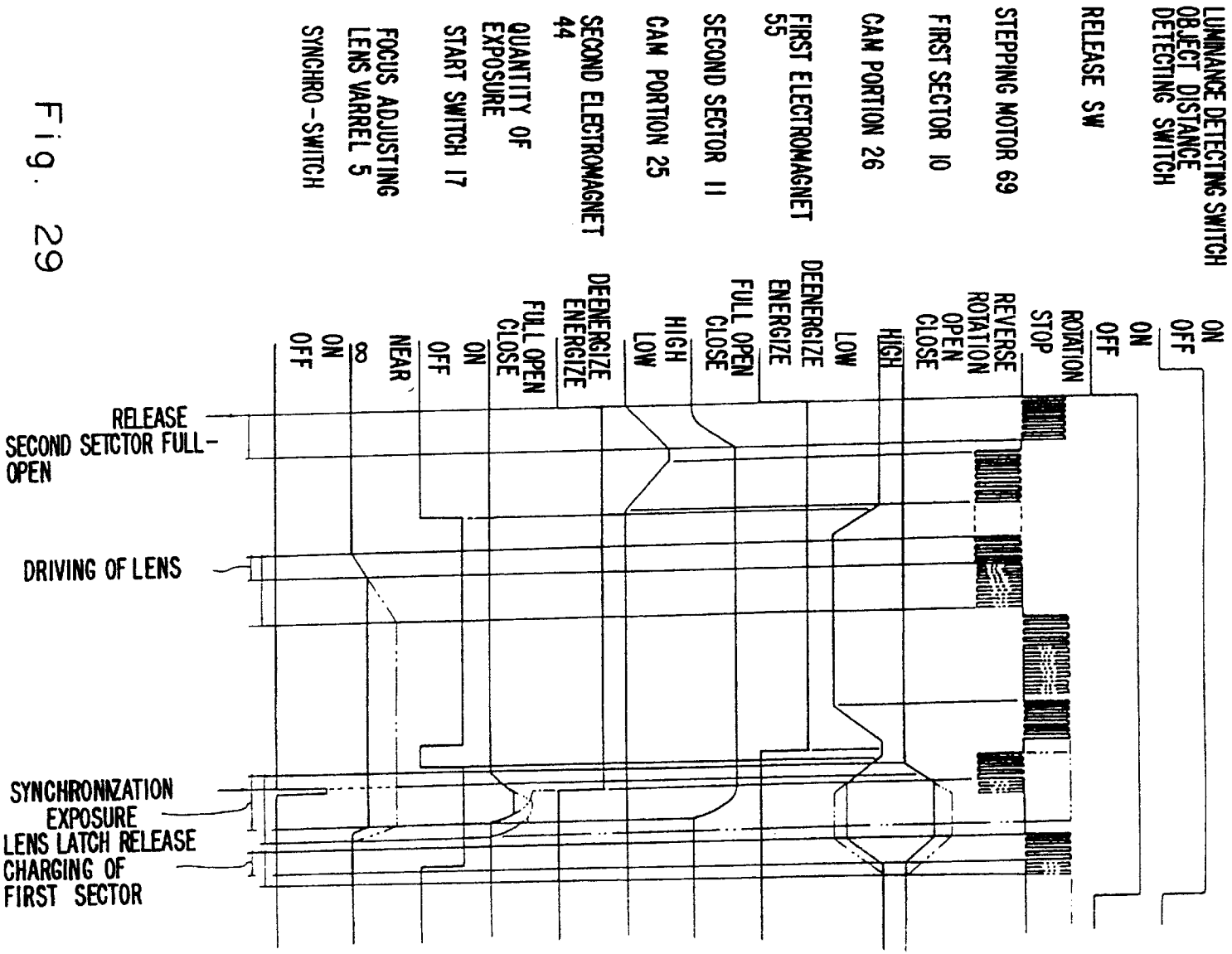

Conversely, in case of a far object distance, since the above-mentioned diaphragm value is set to be an open diaphragm value, the stepping motor 69 is stopped after it rotates by one pulse immediately after the strobe light emission, so that no further opening of the first sector 10 takes place. After the lapse of a predetermined time necessary for the appropriate exposure obtained by the photometer means 89, the second electromagnet 44 is deenergized in accordance with the signal of the electromagnet control circuit 42. As a result, the lever member 19 is rotated together with the operational member 37 in the clockwise direction by the spring 43. Consequently, the abutment lever 36 is disengaged from the engaging tooth 54*a* to release the sector blade 11*a*, so that the sector blades 11*a* and 11*b* are rotated in the counterclockwise direction and the clockwise direction by the biasing force of the spring 61 through the second sector opening and closing lever 60, respectively. Thus, the opening S' is closed to complete the exposure (FIG. 28).

Since the rotation of the second sector lever 21 in the clockwise direction by the spring 61 causes the bar member 139 to rotate in the same direction, the lens abutment lever 135 is pushed up at the opposite end thereof by the bar member 139. Since the spring force of the spring 61 is stronger than that of the spring 137, the lens abutment lever 135 is rotated in the clockwise direction. Consequently, the pawl 135*a* is disengaged from the ratchet teeth 20*a* of the operation ring 20, so that the operation ring 20 is rotated in the clockwise direction by the spring 87 and returned to the initial position. Thus, the focus adjusting lens barrel 5 is retracted into a position before the operation by the operational lever 83 which rotates in the clockwise direction.

Thereafter, the stepping motor 69 is rotated in the forward direction in accordance with the command signal of the motor drive control circuit 32 to rotate the operational plate 16 in the clockwise direction again. As a result, the operational bar 49' gradually rides over the cam portion 26, so that the first sector lever 46 is rotated in the counterclockwise direction against the spring 53 to return the first sector 10 to the closed position. In this moment, since the abutment bar 31 rides over the cam portion 23, the torsion spring 28 separates from the terminal 17*a* to turn the start switch 17 OFF. Consequently, the stepping motor 69 stops the forward rotation, so that the shutter device 1" is returned to the initial position shown in FIG. 16. Thus, all the operations are completed.

We claim:

1. A shutter device for a camera comprising:

first and second sector mechanisms comprising a lens shutter and which are independently opened and closed to define an aperture;

photometer means for detecting the luminance of an object to be photographed;

diaphragm control means for controlling the aperture defined by said second sector mechanism in accordance with luminance data detected by said photometer means, said diaphragm control means comprising a stepping motor which rotates by a predetermined number of pulses in accordance with luminance data of said photometer means;

a single drive source for said first and second sector mechanisms, said single drive source comprising: shutter opening means for normally closing said first sector mechanism and opening said first sector mechanism when said second sector mechanism is held to define a predetermined aperture determined by said diaphragm control means; and shutter closing means for closing said second sector mechanism at a predetermined timing in accordance with the luminance data of said photometer means after said first sector mechanism is opened by said shutter opening means.

2. A shutter device according to claim 1, wherein said diaphragm control means further comprises an operational plate which is rotated by said stepping motor to open said second sector mechanism.

3. A shutter device according to claim 2, further comprising a cam mechanism positioned between said stepping motor and said operational plate to determine the angular displacement of said second sector mechanism in accordance with the angular displacement of said operational plate.

4. A shutter device according to claim 1, wherein said second sector mechanism comprises a pair of sector blades of predetermined shape which are associated with each other to open and close the aperture.

5. A shutter device according to claim 4, further comprising an engaging member for holding or releasing said sector blades, which is disengageably engaged by ratchet teeth which are directly formed on said sector blades of the said second sector mechanism.

6. A shutter device according to claim 5, further comprising biasing means for continuously biasing said engaging member to engage with said ratchet teeth.

7. A shutter device according to claim 1, further comprising biasing means for continuously biasing said second sector mechanism to close the same.

8. A shutter device according to claim 7, wherein said diaphragm control means comprises a stepping motor which opens said second sector mechanism to a predetermined aperture against said biasing means in accordance with the luminance data of said photometer means, and a second sector abutment means for holding said second sector mechanism at said predetermined aperture against said biasing means.

9. A shutter device according to claim 8, wherein said shutter closing means comprises releasing means for releasing said engagement of the second sector mechanism by said second sector abutment means.

10. A shutter device according to claim 1, further comprising biasing means for continuously biasing said first sector mechanism to open.

11. A shutter device according to claim 10, wherein said shutter opening means comprises a motor which closes said first sector mechanism against said biasing means, and first sector abutment means for holding said first sector mechanism at said closed position and for releasing said first sector mechanism at a predetermined timing.

12. A shutter device according to claim 11, wherein said motor is a stepping motor which drives said second sector mechanism to a predetermined aperture in accordance with luminance data of said photometer means, said first and second sector mechanisms being actuated by rotation of said stepping motor in the forward and reverse directions.

13. A shutter device according to claim 1, wherein said camera includes a strobe and a daylight synchro photographing mode, and said shutter device further comprises control means, for sequentially performing:

opening said second sector mechanism and holding said second sector mechanism at the open position;

controlling said first sector mechanism to have an aperture in accordance with luminance data of said photometer means;

scanning a trigger signal to said strobe at a predetermined timing before the aperture of said sector mechanism becomes a predetermined value; and, closing said second sector mechanism.

14. A shutter device according to claim 13, wherein said control means further performs increasing the aperture [em] *of* the second sector mechanism even after the strobe light emission when the object distance is smaller than a predetermined value.

15. The shutter device according to claim 2, further comprising a first sector operational bar for operating said first sector mechanism; a second sector operational bar for operating said second sector mechanism, and a plurality of cams provided on the outer periphery of said operational plate.

16. The shutter device for a camera according to claim 1, wherein said stepping motor actuates said first and second sector mechanisms in accordance with forward and reverse rotation of said stepping motor.

17. A shutter device for a camera comprising first and second sector mechanisms which independently open and close a photographing aperture, and first sector mechanism adapted to open a shutter, said second sector mechanism adapted to set the aperture and close the shutter, said first and second sector mechanisms being controllably moved to open and close the shutter and set the photographing aperture in response to rotation of a stepping motor-driven plate containing a plurality of sector mechanism actuating cam surfaces.

18. The shutter device for a camera according to claim 17, further comprising control means for sequentially opening and holding said second sector mechanism at the opened position, for positioning said first sector mechanism to have a predetermined aperture in accordance with luminance data of a photometric means, for sending a trigger signal to a strobe at a predetermined time before an aperture defined by said first sector mechanism reaches said predetermined aperture, and for closing said second sector mechanism.

19. The shutter device for a camera according to claim 17, wherein said second sector mechanism comprises a plurality of sector members, at least one of said members being provided with a plurality of rachet teeth, said rachet teeth being adapted to be disengagably engaged by means for holding said sector members in a predetermined aperture defining position.

20. A shutter device of a camera comprising:

a first sector mechanism which is normally biased to open by first biasing means;

first sector mechanism abutment means for holding said first sector mechanism at an optional aperture;

a second sector mechanism which is normally biased to close by second biasing means;

second sector mechanism *abutment means for holding said second sector mechanism* at an optional aperture; and a stepping motor, [which opens and closes] *said stepping motor comprising means for opening and closing* said first and second sector mechanism;

said camera comprising a strobe and photometer means for detecting luminance data of an object to be photographed;

said camera comprising a normal photographing mode in which said second sector mechanism is opened by said stepping motor to a predetermined diaphragm aperture in accordance with said luminance data, so that said second sector mechanism is held by said second sector mechanism abutment means, and then, said first sector mechanism abutment means and said second sector mechanism abutment means release said first [biasing means] *sector mechanism* and said second sector mechanism [by said first biasing means and said second biasing means] to open said first sector mechanism and close said second sector mechanism *by said first biasing means and said second biasing means* to complete the exposure; and a daylight synchro photographing mode in which said second sector mechanism is opened by said stepping motor, to hold said second sector mechanism by said second sector mechanism abutment means, and then said first sector mechanism is opened *by said stepping motor* to a predetermined diaphragm aperture in accordance with luminance data [by said stepping motor], and finally said second sector mechanism abutment means is released to close said second sector mechanism by said second biasing means to complete the exposure;

said shutter device further comprising daylight trigger means for sending a light emission signal to said strobe at a predetermined light emission timing before said first sector mechanism provides said predetermined diaphragm aperture, in said daylight synchro photographing mode.

21. A shutter device according to claim 20, said camera comprising object distance detecting means for detecting the distance of an object to be photographed, and wherein said daylight trigger means controls the light emission timing in accordance with object distance data of said object distance detecting means.

22. A shutter device according to claim 20, wherein said diaphragm aperture defined by said second sector mechanism is increased by further rotation of said stepping motor even after said strobe light is emitted when the object distance is below a predetermined value.

23. A daylight synchro photographing method in a camera having first and second sector mechanisms which constitute a lens shutter and which are independently opened and closed, a strobe, and [a] photometer means for detecting the luminance of an object to be photographed, comprising [a] *in* sequence;

opening said second sector mechanism and holding said second sector mechanism at a predetermined open position;

opening said first sector mechanism to a predetermined diaphragm aperture in accordance with the luminance data of the object;

sending a light emission signal to said strobe at a predetermined timing before said diaphragm aperture defined by said first sector mechanism becomes a predetermined value; and closing said second sector mechanism.

24. A shutter device for a camera comprising:

first and second sector mechanisms comprising a lens shutter adapted to be independently opened and closed to define an aperture;

photometric means for detecting the luminance of an object to be photographed;

diaphragm control means for controlling an aperture defined by said second sector mechanism in accordance with luminance data detected by said photometric means;

shutter opening and closing means for moving said first sector mechanism from a closed position to an opened position when said second sector mechanism defines an aperture, and moving said second sector mechanism from an aperture defining position to a closed position a predetermined time after said first sector mechanism is moved to the opened position; and means for biasing at least one of said first and second sector mechanisms to one of said opened and closed positions.

*25. A camera comprising:*

*photometry means for providing luminance data of an object to be photographed;*

*first and second sector mechanisms which are independently openable and closable, said first and second sector mechanisms comprising a lens shutter;*

*operation means for controlling an aperture defined by said second sector mechanism, said operation means comprising a stepping motor operable to rotate by a predetermined amount in accordance with luminance data provided by said photometry means;*

*shutter opening means for normally closing said first sector mechanism and for opening said first sector mechanism when said second sector mechanism is held to define a predetermined diaphragm aperture controlled by said operation means; and*

*shutter closing means for closing said second sector mechanism at a predetermined timing in accordance with luminance data provided by said photometry means, after said first sector mechanism is opened by said shutter opening means,*

*wherein said stepping motor is rotatable for closing said first sector mechanism after said second sector mechanism is closed.*

*26. The camera according to claim 25, further comprising first sector biasing means for continuously biasing said first sector mechanism to open.*

*27. The camera according to claim 26, said shutter opening means comprising first sector abutment means operable for holding said first sector mechanism at a closed position and for releasing said first sector mechanism at a predetermined timing, said shutter opening means being movable by said stepping motor, said stepping motor being operable to close said first sector mechanism against a bias of said first sector biasing means.*

*28. The camera according to claim 27, said first sector abutment means comprising an electromagnet.*

*29. The camera according to claim 25, further comprising second sector biasing means for continuously biasing said second sector mechanism to close.*

*30. The camera according to claim 29, said shutter closing means comprising a second sector abutment means operable for holding said second sector mechanism at said predetermined diaphragm aperture, said operation means comprising means for operating said stepping motor to open said second sector mechanism to said predetermined diaphragm aperture against a bias of said second sector biasing means.*

*31. The camera according to claim 30, said second sector abutment means comprising engaging means for holding said second sector mechanism at said predetermined aperture diaphragm, said shutter closing means comprising releasing means for releasing said engaging means.*

*32. The camera according to claim 31, said engaging means comprising an operational plate arranged for rotation by said stepping motor, for controlling the aperture defined by said second sector mechanism.*

*33. The camera according to claim 32, further comprising a cam mechanism provided between said stepping motor and said operational plate to determine angular displacement of said second sector mechanism in association with an angular displacement of said operational plate.*

*34. The camera according to claim 33, said operational plate comprising ratchet teeth formed thereon, said engaging means further comprising an engaging member for disengagedly engaging said ratchet teeth for holding or releasing said second sector mechanism.*

*35. The camera according to claim 34, said releasing means comprising an electromagnet.*

*36. The camera according to claim 30, said second sector mechanism comprising a pair of said second sector blades which are associated with each other for opening and closing.*

*37. The camera according to claim 36, further comprising ratchet teeth formed on at least one of said second sector blades, said second sector abutment means comprising an engaging member for disengagedly engaging said ratchet teeth for holding said second sector blades, said shutter closing means comprising releasing means for releasing said engaging member.*

*38. The camera according to claim 37, further comprising biasing means for continuously biasing said engaging member to engage with said ratchet teeth.*

*39. The camera according to claim 38, wherein said releasing means comprises an electromagnet.*

*40. The camera according to claim 30, further comprising a strobe unit and a daylight synchro photographing mode, said shutter opening means comprising means movable by said stepping motor, and control means for actuating, in said daylight synchro photographing mode, said operation means to operate said stepping motor in a first direction to rotate, to open and hold said second sector mechanism at an open position, and for actuating said stepping motor to rotate in an opposite direction to move said shutter opening means to open said first sector mechanism to provide an aperture in accordance with luminance data provided by said photometry means when said second sector mechanism is held in said open position, and to provide a trigger signal to said strobe unit at a predetermined timing before an aperture defined by said first sector mechanism becomes a predetermined value.*

*41. The camera according to claim 39, further comprising a strobe unit and a daylight synchro photographing mode, said shutter opening means comprising means movable by said stepping motor, and control means for actuating, in said daylight synchro photographing mode, said operation means to operate said stepping motor in a first direction to rotate, to open and hold said second sector mechanism at an open position, and for actuating said stepping motor to rotate in an opposite direction to move said shutter opening means to open said first sector mechanism to provide an aperture in accordance with luminance data provided by said photometry means when said second sector mechanism is held in said open position, and to provide a trigger signal to said strobe unit at a predetermined time before an aperture defined by said first sector mechanism becomes a predetermined value.*

*42. The camera according to claim 40, further comprising object distance detecting means, said control means sending said trigger signal in accordance with object distance data detected by said object distance detecting means.*

*43. The camera according to claim 41, further comprising object distance detecting means, said control means sending said trigger signal in accordance with object distance data detected by said object distance detecting means.*

*44. The camera according to claim 42, wherein, when an object distance is smaller than a predetermined value, said control means actuates said operation means to rotate said stepping motor to further open said second sector mechanism even after strobe light emission.*

*45. The camera according to claim 43, wherein, when an object distance is smaller than a predetermined value, said control means actuates said operation means to rotate said stepping motor to further open said second sector mechanism even after strobe light emission.*

*46. A method of providing a daylight synchro photographing mode for a camera having first and second sector mechanisms which independently open and close a photographing aperture, said method comprising:*

*(a) opening the second sector mechanism and holding the second sector mechanism at an open position;*

*(b) starting an exposure in the daylight synchro photographing mode by opening the first sector mechanism to a predetermined diaphragm aperture in accordance with luminance data of an object to be photographed;*

*(c) actuating a strobe at a predetermined timing before a diaphragm aperture defined by the first sector mechanism becomes a predetermined value; and*

*(d) closing said second sector mechanism to finish an exposure in the daylight synchro photographing mode.*

*47. A shutter device for a camera comprising:*

*first and second sector mechanisms comprising a lens shutter and which are independently opened and closed;*

*photometering means for detecting luminance of an object to be photographed;*

*diaphragm control means, responsive to luminance data of said photometering means, for controlling an aperture defined by said second sector mechanism in accordance with the luminance data detected by said photometering means;*

*shutter opening means for normally closing said first sector mechanism and opening said first sector mechanism when said second sector mechanism is held to define a predetermined aperture defined by said diaphragm control means;*

*shutter closing means for closing said second sector mechanism at a predetermined timing in accordance with the luminance data of said photometering means after said first sector mechanism is opened by said shutter opening means; and*

*a single drive source, said single drive source comprising said shutter opening means and said shutter closing means.*

*48. A shutter device for a camera according to claim 47, and further comprising means for returning said first sector mechanism to a closed state after said second sector mechanism is closed, said returning means comprising a stepping motor and means for rotating said stepping motor in a first direction to determine an aperture defined by said second sector mechanism, and rotating said stepping motor in a direction opposite said first direction for returning said first motor mechanism to the closed state after the second sector mechanism is closed.*

* * * * *